US012465462B2

(12) United States Patent
VanNoy et al.

(10) Patent No.: US 12,465,462 B2
(45) Date of Patent: Nov. 11, 2025

(54) MANUFACTURE OF PATIENT-SPECIFIC ORTHODONTIC TUBE

(71) Applicant: LightForce Orthodontics Inc., Burlington, MA (US)

(72) Inventors: Samuel VanNoy, Somerville, MA (US); Dylan Winchell, Canton, MA (US); Kelsey A. Fafara, Watertown, MA (US); Oisín Duggan, Somerville, MA (US); Alfred Charles Griffin, III, Lynnfield, MA (US)

(73) Assignee: LightForce Orthodontics, Inc., Burlington, MA (US)

( * ) Notice: Subject to any disclaimer, the term of this patent is extended or adjusted under 35 U.S.C. 154(b) by 315 days.

(21) Appl. No.: 17/827,481

(22) Filed: May 27, 2022

(65) Prior Publication Data

US 2022/0378551 A1    Dec. 1, 2022

Related U.S. Application Data

(60) Provisional application No. 63/318,954, filed on Mar. 11, 2022, provisional application No. 63/195,052, filed on May 30, 2021.

(51) Int. Cl.
*B33Y 50/02* (2015.01)
*A61C 7/00* (2006.01)
(Continued)

(52) U.S. Cl.
CPC .............. *A61C 7/282* (2013.01); *A61C 7/002* (2013.01); *A61C 9/004* (2013.01); *A61C 13/34* (2013.01);
(Continued)

(58) Field of Classification Search
CPC ......... A61C 7/282; A61C 7/002; A61C 9/004; A61C 13/34; A61C 7/16; A61C 7/14;
(Continued)

(56) References Cited

U.S. PATENT DOCUMENTS 6,164,964 A    12/2000  Nakagawa
7,361,018 B2    4/2008  Imgrund et al.
(Continued)

FOREIGN PATENT DOCUMENTS

WO    WO 2019/210015 A1    10/2019

OTHER PUBLICATIONS

PCT/US2022/031421, Dec. 14, 2023, International Preliminary Report on Patentability.
(Continued)

*Primary Examiner* — Yuhui R Pan
(74) *Attorney, Agent, or Firm* — Wolf, Greenfield & Sacks, P.C.

(57) ABSTRACT

Embodiments relate to the methodology of direct manufacture of a customized labial/lingual orthodontic tube by using a ceramic slurry-based additive manufacturing (AM) technology. For example, a method of manufacturing customized ceramic labial/lingual orthodontic tubes by additive manufacturing may comprise measuring dentition data of a profile of teeth of a patient, based on the dentition data, creating a three-dimensional computer-assisted design (3D CAD) model of the patient's teeth, and saving the 3D CAD model, designing a virtual 3D CAD tube structure model for a single labial or lingual tube structure based upon said 3D CAD model, importing data related to the 3D CAD tube structure model into an additive manufacturing machine, and directly producing the tube with the additive manufacturing machine by layer manufacturing from an inorganic
(Continued)

material including at least one of a ceramic, a polymer-derived ceramic, and a polymer-derived metal.

20 Claims, 22 Drawing Sheets

(51) Int. Cl.
| | |
|---|---|
| A61C 7/28 | (2006.01) |
| A61C 9/00 | (2006.01) |
| A61C 13/34 | (2006.01) |
| B28B 1/00 | (2006.01) |
| B28B 17/00 | (2006.01) |
| B29C 64/393 | (2017.01) |
| B33Y 10/00 | (2015.01) |
| B33Y 50/00 | (2015.01) |
| B33Y 80/00 | (2015.01) |
| B29L 31/00 | (2006.01) |

(52) U.S. Cl.
CPC .......... *B28B 1/001* (2013.01); *B28B 17/0081* (2013.01); *B29C 64/393* (2017.08); *B33Y 10/00* (2014.12); *B33Y 50/00* (2014.12); *B33Y 50/02* (2014.12); *B33Y 80/00* (2014.12); *B29L 2031/753* (2013.01)

(58) Field of Classification Search
CPC ... B28B 1/001; B28B 17/0081; B29C 64/393; B33Y 10/00; B33Y 50/00; B33Y 50/02; B33Y 80/00; B29L 2031/753
See application file for complete search history.

(56) References Cited

U.S. PATENT DOCUMENTS

| | | |
|---|---|---|
| 8,142,187 B2 | 3/2012 | Sporbert et al. |
| 8,192,197 B2 | 6/2012 | Sporbert et al. |
| 11,382,719 B2 | 7/2022 | Gualano |
| 11,648,086 B2 | 5/2023 | Boronkay |
| 11,723,752 B2 | 8/2023 | Broyles et al. |
| 11,864,974 B2 | 1/2024 | Roein Peikar et al. |
| 11,883,257 B2 | 1/2024 | Sommer et al. |
| 11,890,157 B2 | 2/2024 | Griffin, III et al. |
| 2005/0239012 A1 | 10/2005 | Bathen et al. |
| 2009/0017411 A1 | 1/2009 | Pospisil et al. |
| 2010/0106465 A1 | 4/2010 | Sporbert et al. |
| 2014/0154637 A1 | 6/2014 | Hansen et al. |
| 2018/0065118 A1 | 3/2018 | Koh et al. |
| 2019/0210015 A9 | 7/2019 | Koh et al. |
| 2019/0328493 A1 | 10/2019 | Griffin, III et al. |
| 2019/0377327 A1* | 12/2019 | Griffin, III .............. C04B 35/56 |
| 2021/0128277 A1 | 5/2021 | Jackson et al. |
| 2022/0061964 A1 | 3/2022 | Khoshnevis et al. |
| 2022/0249205 A1 | 8/2022 | Chun et al. |
| 2022/0378552 A1 | 12/2022 | VanNoy et al. |
| 2022/0378553 A1 | 12/2022 | VanNoy et al. |

OTHER PUBLICATIONS

PCT/US2022/031421, Nov. 9, 2022, International Search Report and Written Opinion.
International Preliminary Report on Patentability mailed Dec. 14, 2023 for International Application No. PCT/US031421.
Invitation to Pay Additional Fees mailed Sep. 19, 2022 in connection with International Application No. PCT/US2022/031421.
International Search Report and Written Opinion mailed Nov. 9, 2022 in connection with International Application No. PCT/US2022/031421.

* cited by examiner

MANUFACTURE OF PATIENT-SPECIFIC ORTHODONTIC TUBE

RELATED APPLICATIONS

This Application claims priority under 35 U.S.C. § 119(e) to U.S. Provisional Application Ser. No. 63/318,954 filed on Mar. 11, 2022, entitled "MANUFACTURE OF PATIENT-SPECIFIC ORTHODONTIC TUBE", and to U.S. Provisional Application Ser. No. 63/195,052 filed on May 30, 2021, entitled "MANUFACTURE OF PATIENT-SPECIFIC ORTHODONTIC TUBES", each of which is incorporated by reference herein in its entirety.

FIELD

An embodiment of present invention relates generally to the manufacturing of ceramic labial/lingual orthodontic tubes for straightening the teeth and correcting malocclusion. More specifically, an embodiment of the invention relates to the methodology of direct manufacture of customized labial/lingual orthodontic tube by using a ceramic slurry-based additive manufacturing (AM) technology.

BACKGROUND

Orthodontics has been widely adapted in clinics to correct malocclusion and straighten teeth. The traditional method is to adhere preformed brackets and tubes onto the teeth and run elastic metal wires of round, square, or rectangular cross-sectional shape through the tube slots to provide the driving force. The adaptation of the bracket and tube to the individual tooth is performed by filling the gap between the tooth surface and bracket and tube surface with adhesive. This thereby bonds the brackets and tubes to the tooth such that the bracket and tube slots, when the teeth are moved to their final position, lie in a near flat (depending on manufacturing accuracy) horizontal plane.

SUMMARY

Some embodiments of the present invention provide improved techniques for creating custom lingual or labial ceramic orthodontic tubes, and which provides the capability for in-office fabrication of such tubes.

Pre-formed edgewise tubes may have no prescription, requiring adjustment of the archwire. Alternatively, the edgewise tubes may have an idealized prescription of angulation, inclination, or in/out variation for specific teeth in what is referred to as a "straight-wire appliance". Because the tube pad is typically not custom made for an individual patient's tooth, the clinician is responsible for the tube placement, which may introduce a source of error, which commonly increases patient visits and overall treatment time. These tubes are typically off-the-shelf products. A misplacement in bonding a tube to a tooth can be corrected by compensation bends in the wire or by debonding and repositioning of the tube, both of which increase time and cost. Custom metal lingual tubes are currently available that are fabricated at a central location from 3D scans or impressions of the dentition and mailed back to the clinician and transferred to the patient via indirect bonding. Selective laser melting (SLM) is a 3DAM technique that has been used to create custom metal lingual brackets and tubes (for example, see U.S. Pat. No. 8,694,142), but this technique suffers from insufficient resolution and surface finish. While true custom labial tubes have been used, custom positioning of a standard, non-custom tube can be created via indirect bonding which itself has inherent error within the tube itself. Many current true custom labial systems (SURESMILE™ Inc.) rely heavily on putting custom bends in the wire based on a 3D scan rather than creating a true straight-wire appliance. For example, U.S. Pat. No. 8,690,568 provides for a method to weld a metal bracket slot to a stock metal bracket base into a custom position, but does not describe a method for creating a custom bracket base or to create an aesthetic, non-metal bracket. These partially custom metal brackets and tubes (akin to tubes) suffer from inaccuracy in slot position and premature debonding due a stock base that doesn't match the tooth morphology, and are unappealing to older patients who prefer to have non-metal appliances for aesthetic concerns. Ceramic brackets have been commercially available and studied since the 1980s and are a desirable material compared to metal brackets due to their excellent esthetics, resistance to creep, rigidity, biocompatibility, corrosion resistance, stability in the oral environment and non-toxic nature. However, non-customized ceramic tubes have only been available since 2018 as the need for an aesthetic alternative to metal is not as concerning to patients due to their location in the bracket of the mouth. Ceramic brackets and tubes are predominantly manufactured by injection molding, which has manufacturing limitations. For example, it may be difficult or impossible to use injection molding to create undercuts that may enhance a tube's mechanical bond strength to a tooth adhesive.

Ceramic tubes, unlike metal, do not bend in order to debond but instead the connection between the tube and the bonding material must be broken. Due to the mechanical properties of ceramic and this debond mechanism, there is a higher risk of enamel damage when debonding a tube if the tube does not easily separate from the tooth. In this case a diamond burr is necessary to drill the tube off the tooth which can create sparks, take a long time, and result in a poor patient and provider experience.

Currently, there are no commercially available ceramic tubes which debond via a controlled fracture along a form of 'stress concentrator' designed to force the tube to break at a particular location when pressure is applied. A static shape for the stress concentrator does not provide a consistent debonding experience depending on the thickness (in-out) of the tube and its exact position on the tooth, and thus a custom shape must also be used.

Currently, no system for creating an esthetic custom lingual or labial ceramic orthodontic tube exists, and no custom bracket and tube system exists that may be fabricated 100% in-office by trained members of a private orthodontic practice. A need arises for more efficient and accurate techniques for creating custom lingual and labial ceramic orthodontic tubes, and more aesthetic labial tubes.

Some embodiments of the present invention may be used to solve problems occurring in the current manufacturing techniques of straight wire appliance orthodontic tubes. For example, in one embodiment, it may provide a direct manufacturing method of customized lingual/labial tubes by utilizing any number of ceramic slurry-based AM technologies, examples of which may include digital light processing (DLP), laser photopolymerization stereolithography, jet printing (including particle jetting, nanoparticle jetting), layer slurry depositioning (LSD), or laser-induced slip casting. A slurry is defined as inorganic particles dispersed in a liquid, and may be photopolymerizable or may polymerize by other mechanisms. Likewise, similar methods may be used to create metal tubes wherein the inorganic materials in the slurry are metal. Examples of items that may be produced include customized labial/lingual tubes according to individual dental and craniofacial features, which may have a direct tooth-matching fault line/grooves (also referred to as fracture grooves, stress concentrators, or breakaway mechanisms) designed into the tube. Ceramic slurry-based AM may be performed in a device small enough to comfortably fit in a private orthodontic lab and can currently be obtained at a reasonable price, given the market price and in-office volume for non-custom and custom tubes.

For example, in some embodiments, a method of manufacturing customized ceramic labial/lingual orthodontic tubes by ceramic slurry-based AM may comprise measuring dentition data of a profile of teeth of a patient, based on the dentition data, creating a three dimensional computer-assisted design (3D CAD) model of the patient's teeth using reverse engineering, and saving the 3D CAD model on a computer, designing a 3D CAD tube structure model for a single labial or lingual tube structure, importing data related to the 3D CAD tube structure model into a ceramic slurry-based AM machine, directly producing the tube (green part) in the ceramic slurry-based AM machine by layer manufacturing. Processing the tubes may occur in a sintering and debinding furnace prior to direct use or other post-processing steps related to surface properties.

The 3D CAD tube structure model may include data representing at least a) the tube pad (base) that has recesses and/or undercuts into the bonding surface of the tube, to contact a particular tooth's surfaces, b) fault grooves (also referred to as fracture grooves, stress concentrators, or breakaway mechanisms) that are matched to the patient's teeth to facilitate debonding, c) slots for positioning according to the orthodontic needs of the patient, d) a tube material, e) the particular tooth's profile, and f) a tube guide to guide 3-dimensional placement of the tube onto the tooth.

The ceramic slurry-based AM machine may comprise a molding compartment comprising a platform and a plunger to directly produce the tube by layer manufacturing, a material compartment, and an LED light source for digital light processing, or a print-head with at least one dispensing nozzle as used in "jet" printing, wherein the tube is produced by layer manufacturing using slicing software to separate the 3D CAD tube structure model into layers and to get a horizontal section model for each layer so that a shape of each layer produced by the ceramic slurry-based AM machine is consistent with the 3D CAD structure data. The ceramic slurry-based AM machine may comprise a vat adapted to hold the tube during manufacturing, a horizontal build platform adapted to be held at a settable height above the vat bottom, an exposure unit, adapted to be controlled for position selective exposure of a surface on the horizontal build platform with an intensity pattern with predetermined geometry, a control unit, adapted to receive the 3D CAD tube structure model and, using the 3D CAD tube structure model to polymerize in successive exposure steps layers lying one above the other on the build platform, respectively with predetermined geometry, by controlling the exposure unit, and to adjust, after each exposure step for a layer, a relative position of the build platform to the vat bottom, to build up the object successively in the desired form, which results from the sequence of the layer geometries. The exposure unit may further comprise a laser as a light source, a light beam of which successively scans the exposure area by way of a movable mirror controlled by the control unit.

The ceramic slurry-based AM machine may include a light source that is a laser or LED light source. A light source of the DLP machine may radiate a wavelength between 400 and 500 nm. The DLP machine may include a digital light processing chip as a light modulator. The digital light processing chip may be a micromirror array or an LCD array. Alternatively, the ceramic slurry-based AM machine may use a jet technology whereby a liquid ceramic slurry is jetted onto a build-plate in layers, with or without another jet dispensing non-ceramic support material.

Measuring dentition data may be performed using a CT scanner, intra-oral scanner, a coordinate measuring machine, a laser scanner, or a structured light digitizer. Measuring dentition data may be performed by conducting 3D scanning on a casted or 3D printed teeth model.

The light-polymerizable material may be selected from the group consisting of high strength oxides, nitrides and carbides ceramics and metals including but not limited to: Aluminum Oxide (Al2O3), Zirconium Oxide (ZrO2), Alumina-toughened Zirconia (ATZ), Zirconia-toughened alumina (ZTA), Lithium disilicate, Leucite silicate and Silicon Nitride as well as metals such as Stainless Steel 17-4PH or 316 L, Titanium (Ti/Ti-Al6-V4), Cobalt Chromium (CoCr), Tungsten and Tungsten Carbide/Cobalt (W or WC/Co), Silicon Carbide (SiC), Molybdenum (Mo) and precious metals (e.g. gold (Au)).

Directly producing the tube by layer manufacturing may further comprise an apparatus comprising a vat with an at least partially transparent or translucent formed horizontal bottom, into which light polymerizable material can be filled, a horizontal build platform adapted to be held at a settable height above the vat bottom, an exposure unit adapted to be controlled for position and selective exposure of a surface on the build platform with an intensity pattern with predetermined geometry, comprising a light source refined by micromirrors to more precisely control curing, a control unit adapted for polymerizing in successive exposure steps layers lying one above the other on the build platform, controlling the exposure unit so as to selectively expose a photo-reactive slurry in the vat, adjusting, after each exposure for a layer, a relative position of the build platform to the vat bottom, and building up the tube successively in the desired form, resulting from the sequence of the layer geometries. The exposure unit may further comprise a laser as a light source, a light beam of which successively scans the exposure area by way of a movable mirror controlled by the control unit.

A scanning accuracy may be less than 0.02 mm. A manufacturing accuracy may be from 1 to about 60 μm, and wherein the accuracy may be achieved by using a between layer additive error compensation method that predicts an amount of polymerization shrinkage. Manufactured layers of the tube comprise a material selected from the group consisting of high strength oxides, nitrides and carbides ceramics as well as metal including but not limited to: Aluminum Oxide (Al2O3), Zirconium Oxide (ZrO2), Alumina-toughened Zirconia (ATZ), Zirconia-toughened alumina (ZTA), Lithium disilicate, Leucite silicate and Silicon Nitride as well as metals such as Stainless Steel 17-4PH or 316 L, Titanium (Ti/Ti-Al6-V4), Cobalt Chromium (CoCr), Tungsten and Tungsten Carbide/Cobalt (W or WC/Co), Silicon Carbide (SiC), Molybdenum (Mo) and precious metals (e.g. gold (Au)).

The 3D CAD model may be saved as an .stl file or another 3D vector file. The thickness of the manufactured layers may be from 5 to 100 micrometers (μm), and the machine may use a X-Y pixel resolution from 1-100 μm. Different curing strategies (CSs) and depths of cure (Cd) may be used. The selection of material for producing layers of the tube may be based on different force demands.

The printed tubes may have a metal insert that contacts the archwire in the slot. The printed tubes may be of a traditional twin design or are modified to be self-ligating or active ligating and are designed to accommodate 0.018 in to 0.022 in archwires in the slot, but slot height may vary from 0.017-0.023 in. A slot position relative to the tooth may be customized by manufacturing a custom base or by manufacturing a custom slot position where a base is unchanged. The smallest length from a tube pad to slot depth may be from 0.2 mm-3 mm depending on the tube offset required and desire to reduce the tube profile for patient comfort. The tube angulation, offsets, torque, and prescription may be determined based on a chosen treatment. The structural properties of the tube (any location) may be altered to facilitate easier debonding of the tube following treatment. A part of the tube may be a pre-formed green ceramic body that functions to decrease the time and complexity of the printed tube.

The printed tube guides may have a single tube attachment for a single tube. An adhesive material may be used to hold the tube on the ceramic archwire. The adhesive material may be sticky wax. Indirect bonding/custom tube placement may occur via a tray (for example, a silicone based, or vacuum formed tray) that carries the said custom ceramic tubes to the ideal tooth location. The method may further comprise producing a tube guide comprising a rigid ceramic rectangular archwire or other archform that dictates a position of each tube on a tooth in every plane with at least two occlusal/incisal supports adapted to help place tubes via an indirect bonding system. A part of the tube that holds or connects the tube to the tooth surface may be designed based on a surface profile of the tooth.

The tube may have a color that is matched to a color of a tooth to which the tube is to be attached. The tube may be clear. The tube may have a selected color unrelated to a color of a tooth to which the tube is to be attached.

In some embodiments, the 3D CAD tube structure model may include data defining at least one slot adapted to receive an archwire, including data defining a compensation angle for walls of the slot to compensate for shrinkage due to over-polymerization and achieve parallel slot walls.

In some embodiments, the 3D CAD tube structure model may include data defining a contour of a surface of a base of the tube. The contour may be adapted to a shape of a tooth to which the tube is to be bonded. The contour may be further adapted based on at least one of an in/out and offset of the tube, a tip of the slot, and a torque.

In some embodiments, the 3D CAD tube structure model includes data defining a ridge on a circumferential surface of the tube structure base. The ridge can be positioned at an interface of the tube structure base and the tube structure face. The ridge can be positioned on a gingival edge surface of the tube structure, an occlusal edge surface of the tube structure, or both. The height of the ridge can vary along the mesial/distal axis of the tube structure. A height of the ridge can be from about 0.04 mm to about 1 mm. The height of the gingival ridge can be different than a height of the occlusal ridge. The 3D CAD tube structure model can include data defining a gap in the ridge corresponding to a position of the stress concentrator.

In some embodiments, the 3D CAD tube structure model includes data defining a chamfer in a base of the tube structure. The chamfer can be positioned at an interface of the tube structure and the tooth. The chamfer can be positioned on a gingival tube/tooth interface, an occlusal tube/tooth interface, or both. The chamfer can be configured to mate with an orthodontic tool. In some embodiments, the 3D CAD tube structure model may include data defining a fracture groove in the base or face (auxiliary slot, or vertical slot) of the tube. The fracture groove may be adapted so as to fracture upon application of a normal force. The normal force may be applied in at least one of a mesial-distal direction, an occlusal-gingival direction, or to any opposite corners. The fracture groove may be adapted to provide predictable fracture of the tube upon application of the normal force, enabling debonding of the tube though a combination of tensile and peeling forces. The combination of tensile and peeling forces may be less than a shear bond strength of a bonded tube. The normal force may be 10-180 Newtons, inclusive.

The fracture groove may be in a middle vertical third of the tube as defined by the tube dimension or the base dimension if they are not the same. The fracture groove has smoothed edges to avoid trapping intra-oral debris. The fracture groove may include a weakened area including a tooth curved depression occlusal-gingival or mesial-distal direction which may come to a pointed tip. This pointed tip may aid in reliability of the fracture. The fracture groove may match a contour of the tooth for that portion of the tube positioning. The fracture groove may be constant in depth from the tooth surface. The fracture groove may have a depth of 0.10 mm to 1.2 mm, inclusive and may be calculated based on the in-out of the tube. The fracture groove may vary in depth from the tooth surface. The fracture groove may have a variance in depth of up to 50% of the distance from the tooth surface to the deepest part of fracture groove. The width of the fracture groove may be between 0.25 mm and 1.25 mm.

In some embodiments, the 3D CAD tube structure model may include data defining at least some corners of the tube as being rounded. Both gingival and occlusal corners of the tube may be rounded. The rounded corners of the tube may have a radius of curvature of 0.05 to 2.0 mm, inclusive. The rounding may be symmetric or asymmetric.

In some embodiments, the 3D CAD tube structure model may include data defining a plurality of retentive structures in a base of the tube. Each retentive structure may be a three-dimensional figure with a positive draft angle greater than 0°. Each retentive structure may be a three-dimensional figure selected from a group of three-dimensional figures including semi-lunar cones, full-circle cones, squares, rectangles, retentive lattices, and or meshes. Each retentive structure may have a cross-section that is generally trapezoidal, and having a neutral plane oriented toward a tooth structure or surface, which is wider than a base plane oriented toward a tube body. Each neutral plane may be flat. Each neutral plane may be parallel to the base plane. At least some neutral planes may not be parallel to the base plane. At least some neutral planes may not be parallel to the base plane such that an overall pattern of the retentive structures is generally contoured to a shape of a tooth surface to which it is to be bonded. At least some neutral planes may be contoured to a shape of a tooth surface to which it is to be bonded.

In some embodiments, the tube may be adapted to be bonded to the lingual or labial surfaces of a tooth. The labial or lingual tube may be made of Aluminum Oxide (Al2O3), Zirconium Oxide (ZrO2), Alumina-toughened Zirconia (ATZ), Zirconia-toughened alumina (ZTA), Lithium disilicate, Leucite silicate and Silicon Nitride as well as metals such as Stainless Steel 17-4PH or 316 L, Titanium (Ti/Ti-Al6-V4), Cobalt Chromium (CoCr), Tungsten and Tungsten Carbide/Cobalt (W or WC/Co), Silicon Carbide (SiC), Molybdenum (Mo) and precious metals (e.g. gold (Au)).

The 3D CAD tube structure model may include data defining a mesial-distal or horizontal slot adapted to receive an archwire, a vertical slot adapted to receive at least a portion of the archwire within a middle third of the tube, or both. The vertical slot may be further adapted to accept a digitally designed lingual multiloop wire.

Some embodiments provide a method of manufacturing customized orthodontic tubes for patients. The method comprises: obtaining a three-dimensional (3D) model of one or more teeth of a patient; generating a 3D model of an orthodontic tube structure using the 3D model of the one or more teeth of the patient, the orthodontic tube structure comprising: a debonding structure that facilitates debonding of an orthodontic tube from a tooth of the patient; and using an additive manufacturing device to produce a customized orthodontic tube based on the 3D model of the orthodontic tube structure.

In some embodiments, at least a portion of the debonding structure has a customized shape based on a 3D model of at least one of the one or more teeth. In some embodiments, the debonding structure comprises a stress concentrator in a portion of the orthodontic tube structure. In some embodiments, the stress concentrator is shaped such that the customized orthodontic tube fractures when a normal force applied to the stress concentrator. In some embodiments, the stress concentrator runs along an occlusal-gingival direction of the orthodontic tube structure. In some embodiments, the stress concentrator includes a portion with a profile that is substantially triangular cross-section.

In some embodiments, the debonding structure comprises a ridge in the 3D model of the orthodontic tube structure. In some embodiments, the ridge is proximate an interface of a base of the orthodontic tube structure and a face of the orthodontic tube structure. In some embodiments, a height of the ridge varies along a mesial-distal axis of the orthodontic tube structure.

Some embodiments provide a customized orthodontic tube produced by an additive manufacturing device using a 3D model of an orthodontic tube structure generated using a 3D model of one or more teeth of a patient, the customized orthodontic tube comprising: a debonding structure that facilitates debonding of the customized orthodontic tube from a tooth of the patient.

In some embodiments, at least a portion of the debonding structure has a customized shape based on a 3D model of at least one of the one or more teeth. In some embodiments, the debonding structure comprises a stress concentrator in a portion of the customized orthodontic tube. In some embodiments, the customized orthodontic tube fractures in response to application of a normal force to the stress concentrator. In some embodiments, the customized orthodontic tube further comprises: a base; and two portions; wherein: the stress concentrator comprises an approximately V-shaped space between the two portions; and a vertex of the approximately V-shaped space is proximate the base. In some embodiments, each of the two portions comprises a substantially flat wall on a respective side of the approximately V-shaped space.

In some embodiments, the debonding structure comprises at least one ridge. In some embodiments, the customized orthodontic tube further comprises: a base; and a face perpendicular to the base; wherein the at least one ridge is located, at least in part, proximate an intersection of the base and the face. In some embodiments, the face comprises a slot opening sized for an arch wire to be inserted through the slot. In some embodiments, the customized orthodontic tube comprises two portions separated, at least in part, by a space, and the at least one ridge comprises a first ridge and a second ridge, wherein: a first ridge is located on a first one of the two portions; and a second ridge is located on a second one of the two portions. In some embodiments, the space separating the two portions is a stress concentrator.

In some embodiments, the customized orthodontic tube further comprises multiple portions each comprising a respective slot extending through the portion. In some embodiments, the slots of the multiple portions are aligned such that arch wire passes through the slots of the multiple portions.

Some embodiments provide a method of manufacturing customized orthodontic tubes for Patients. The method comprises: obtaining a three-dimensional (3D) model of one or more teeth of a patient; generating a 3D model of an orthodontic tube structure using the 3D model of the one or more teeth of the patient, the orthodontic tube structure comprising: a slot surrounded by a plurality of walls for receiving wire, wherein ends of one or more of the plurality of walls are angled relative to a mesial surface of the orthodontic tube structure; using an additive manufacturing device to produce a customized orthodontic tube based on the 3D model of the orthodontic tube structure.

In some embodiments, the method further comprises: determining an angle of a main portion the slot based on an orthodontic prescription; wherein generating the 3D model of the orthodontic tube structure comprises generating the slot with the determined angle of the main portion of the slot. In some embodiments, the orthodontic prescription comprises an indication of a desired torque, tip, rotation, or a combination thereof, for an associated tooth of the patient's teeth.

In some embodiments, the slot comprises: four walls and four corners; and the slot comprises a mortise in each corner of the slot to prevent polymerization of material in the corners of the slot during additive manufacturing of the customized orthodontic tube.

In some embodiments, the method further comprises: determining a size and shape of the slot based on a size and shape of a wire to be received by the slot; wherein generating the 3D model of the orthodontic tube structure comprises generating the slot with the determined size and shape.

In some embodiments, generating the 3D model of the orthodontic tube structure comprises: determining a grayscale pattern for at least a portion of the slot, wherein the grayscale pattern indicates a pattern of polymerization to be applied by the additive manufacturing device; and applying the grayscale pattern to the at least the portion of the slot. In some embodiments, the grayscale pattern comprises a plurality of pixels each indicating an amount of material to be polymerized at a respective location in the 3D model of the orthodontic tube structure. In some embodiments, the grayscale pattern comprises a plurality of pixels each indicating whether polymerization is turned on or off at a respective location in the 3D model of the orthodontic tube structure.

In some embodiments, the orthodontic tube structure comprises a notch through which material flowing through the slot can exit the orthodontic tube structure. In some embodiments, the orthodontic tube structure comprises an interface adjacent to a build plate on which the customized orthodontic tube is produced; and the notch is located, at least in part, at the interface adjacent to the build plate.

Some embodiments provide a customized orthodontic tube produced by an additive manufacturing device using a 3D model of an orthodontic tube structure generated using a 3D model of one or more teeth of a patient, the customized orthodontic tube comprising: a slot surrounded by a plurality of walls for receiving a wire, wherein ends of one or more of the plurality of walls are angled relative to a mesial surface of the customized orthodontic tube.

In some embodiments, an angle of a main portion of the slot is based on an orthodontic prescription. In some embodiments, the slot is shaped based on a shape of the wire to be received by the slot. In some embodiments, the customized orthodontic tube further comprises a notch that allows material to flow out of the slot through the notch when the customized orthodontic tube is connected to a base plate. In some embodiments, the customized orthodontic tube further comprises two portions, each having a respective slot extended through the portion. In some embodiments, a slot of each of the two portions includes: a first side at which ends of one or more slot walls are angled; and a second side at which ends of one or more slot walls are not angled. In some embodiments, slots of the two portions are aligned such that an angle of a main portion of a first slot is the same as an angle of a main portion of a second slot.

According to some embodiments, the slot is shaped to receive an approximately rectangular wire. According to some embodiments, at least some of the plurality of walls are substantially parallel relative to one another. According to some embodiments, the ends of the one or more walls are each angled between approximately 20 to 80 degrees from a mesial face of the customized orthodontic tube.

Some embodiments provide a method of manufacturing customized orthodontic tubes for Patients. The method comprises: obtaining a three-dimensional (3D) model of one or more teeth of a patient; generating a 3D model of an orthodontic tube structure using the 3D model of the one or more teeth of the patient, the orthodontic tube structure comprising a curved gingival base edge; and using an additive manufacturing device to produce a customized orthodontic tube based on the 3D model of the orthodontic tube structure.

In some embodiments, the method further comprises: determining a radius of curvature of corners of the curved gingival base edge; wherein generating the 3D model of the orthodontic tube structure comprises generating the curved gingival base edge with corners of the determined radius of curvature. In some embodiments, determining the radius of curvature for the corners of the curved gingival base edge comprises determining the radius of curvature based on a 3D model of a tooth of the one or more teeth. In some embodiments, determining the radius of curvature based on the 3D model of the tooth comprises determining the radius of curvature based on a gingival margin of the tooth. In some embodiments, determining the radius of curvature of the corners of the curved gingival base edge comprises determining the radius of curvature based on an orthodontic prescription.

In some embodiments, the orthodontic prescription comprises an indication of torque, tip, rotation, or a combination thereof. In some embodiments, a radius of curvature of a corner of the curved gingival base edge is approximately 0.05 mm to 2.0 mm. In some embodiments, the orthodontic tube structure comprises a curved occlusal edge. In some embodiments, the orthodontic tube structure comprises an angled hook.

In some embodiments, the method further comprises: determining an angle of the angled hook; wherein generating the 3D model of the orthodontic tube structure comprises generating the angled hook with the determined angle. In some embodiments, the angled hook is angled between 0 degrees and 90 degrees labially from a face of the orthodontic tube structure. In some embodiments, the angled hook is angled between 0 degrees and 90 degrees facially from a face of the orthodontic tube structure. In some embodiments, the angled hook is angled between 0 degrees and 45 degrees from a body of the orthodontic tube structure in a plane of the angled hook.

Some embodiments provide a customized orthodontic tube produced by an additive manufacturing device using a 3D model of an orthodontic tube structure generated using a 3D model of one or more teeth of a patient. The customized orthodontic tube comprises: a curved gingival base edge.

In some embodiments, the customized orthodontic tube further comprises a curved occlusal edge. In some embodiments, a curvature of the curved gingival edge is based on a gingival margin of a tooth of the one or more teeth. In some embodiments, a curvature of the curved gingival edge is based on an orthodontic prescription. In some embodiments, a radius of curvature of corners of the curved gingival base edge is approximately 0.05 mm to 2.0 mm.

In some embodiments, the customized orthodontic tube further comprises an angled hook. In some embodiments, the angled hook is angled relative to a body of the customized orthodontic tube to avoid contact of the angled hook with a portion of the patient's mouth.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF THE DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
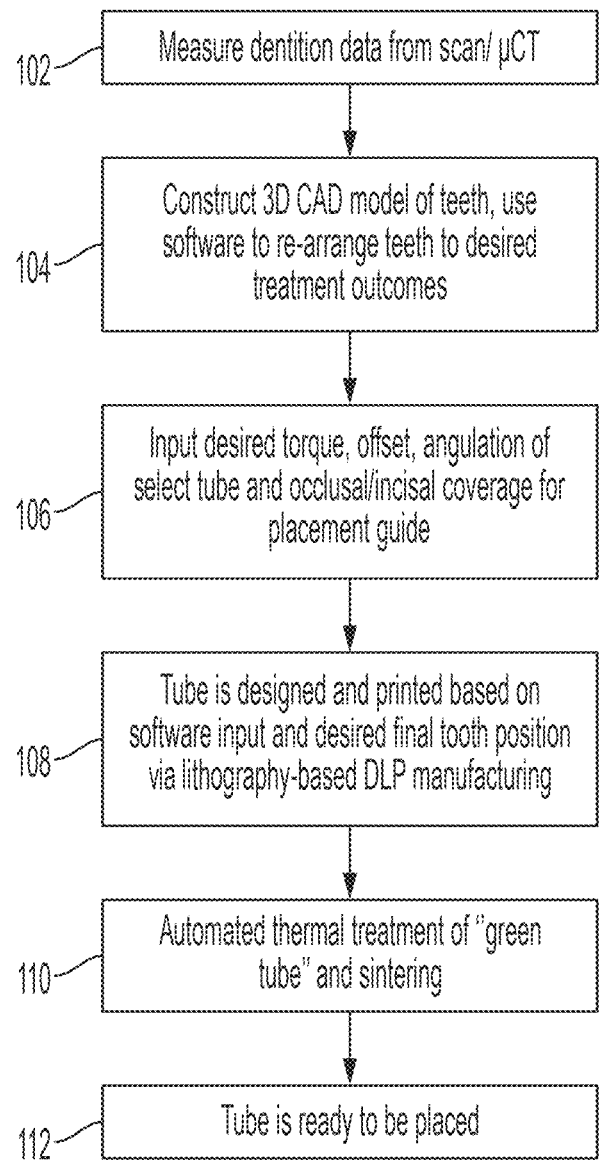
FIG. 1 shows a flowchart of an example process of direct manufacturing process of lingual or labial orthodontic tubes by ceramic slurry-based AM, according to some embodiments of the technology described herein.

Some embodiments of the present invention provide improved techniques for creating custom lingual or labial orthodontic tubes, and which provides the capability for in-office fabrication of such tubes. A lingual or labial orthodontic tube may also be referred to herein as an "orthodontic tube" or a "tube".

The inventors have recognized that conventional orthodontic tubes may not reliably debond from a patient's teeth, and thus are difficult to remove from patient's teeth. As such, conventional orthodontic tubes may require a clinician (e.g., an orthodontist) to apply a large amount of force or otherwise perform significant maneuvering to debond an orthodontic tube from a patient's tooth. This makes treatment more difficult for the clinician while also increasing discomfort for a patient during the treatment.

Accordingly, the inventors have developed a customized orthodontic tube with a debonding structure that allows the orthodontic tube to reliably debond from a tooth, and techniques of manufacturing the customized orthodontic tube. The debonding structure may allow a clinician to apply an amount of force at a location in an orthodontic tube to reliably debond the orthodontic tube from a patient's tooth. In some embodiments, the debonding structure may include a stress concentrator that causes an orthodontic tube to break as a result of a force applied to a particular location in the orthodontic tube. In some embodiments, the debonding structure may include a ridge that allows a clinician to debond an orthodontic tube by applying force on the ridge (e.g., using pliers).

The inventors have further developed a customized orthodontic tube with slots shaped to facilitate orthodontic treatment and techniques of manufacturing the customized orthodontic tube. The techniques may shape the slots to facilitate orthodontic treatment. In some embodiments, the slots may include angled or chamfered wall ends that make insertion of wire into the slots easier for a clinician. In some embodiments, the slots may have customized slot angles to provide a desired force for orthodontic treatment. For example, the slot angle of an orthodontic tube may be customized to apply a force based on an orthodontic prescription that indicating desired movement to be applied to a patient's teeth (e.g., torque, tip, rotation, or a combination thereof).

The inventors have further developed techniques of AM of an orthodontic tube that produce orthodontic tube that more accurately matches dimensions of a 3D model of an orthodontic tube structure. In some embodiments, the techniques determine a grayscale pattern for portions (e.g., pixels) of a slot in a 3D model of an orthodontic tube structure. The grayscale pattern indicates a pattern of polymerization to be applied by an AM device at locations in an orthodontic tube during manufacturing. For example, the grayscale pattern may indicate that polymerization is to be turned off at certain locations and turned on at other locations. In another example, the grayscale pattern may indicate varying intensities of polymerization across portions the slot. The grayscale pattern may result in a manufactured orthodontic tube that more closely matches a 3D model of an orthodontic tube structure used in AM. In some embodiments, the techniques place mortices in corners of a slot in a 3D model of an orthodontic tube structure. The mortices may represent locations where polymerization of an AM device is to be turned off. The mortices in the 3D model of the orthodontic tube structure may reduce roundness in corners of an orthodontic tube produced by AM.

The inventors have developed an orthodontic tube that facilitates post processing of the orthodontic tube after AM. After an orthodontic tube is manufactured by an AM device, it may be necessary to clean the orthodontic tube. For example, cleaning material may be applied to the orthodontic tube to remove any excess unpolymerized material. Accordingly, the inventors have developed an orthodontic tube that includes a notch to facilitate cleaning of an orthodontic tube. The notch may allow material in a slot of the orthodontic tube to flow out of the notch while the orthodontic tube is attached to a base plate on which it was manufactured by an AM device.

The inventors have further developed orthodontic tubes and techniques of manufacturing thereof that reduce discomfort of orthodontic tubes in a patient's mouth. In some embodiments, the techniques produce an orthodontic tube with curved gingival and/or occlusal base edges. The curved gingival and/or occlusal base edges may allow placement of an orthodontic tube closer to gums of a patient while reducing discomfort to the patient by aligning more closely with the patient's gum line. In some embodiments, the techniques produce an orthodontic tube with angled hooks so prevent the hooks from contacting portions of a patient's mouth (e.g., gums and/or cheeks) to reduce discomfort for the patient when the orthodontic tube is placed in the patient's mouth.

An exemplary flowchart of an embodiment of a direct manufacturing process 100 of lingual or labial orthodontic tubes by ceramic slurry-based AM is shown in FIG. 1. The process begins with 102, in which dentition data is measured and the parameters of the tooth profile are analyzed. For example, such measurement may use CT layer scanning a non-contact 3D scanner or an intra-oral scanner directly on the patient's teeth, or may use 3D readings on a teeth model previously cast or 3D printed using a coordinate measuring machine, a laser scanner, or structured light digitizers. The scanning accuracy of such techniques is typically less than 0.02 mm.

In 104, based on the given dentition data, a 3D CAD model of the measured teeth is constructed based on the dentition data and saved in the computer in a typical file format, such as the stl, Additive manufacturing File (AMF) format or any other 3D vector file. The exterior structure of teeth is complicated, usually including irregular curves. The software may then be used to rearrange the teeth in the model to the desired treatment outcomes that may be based on the long-axis of a tooth.

Figure 2:
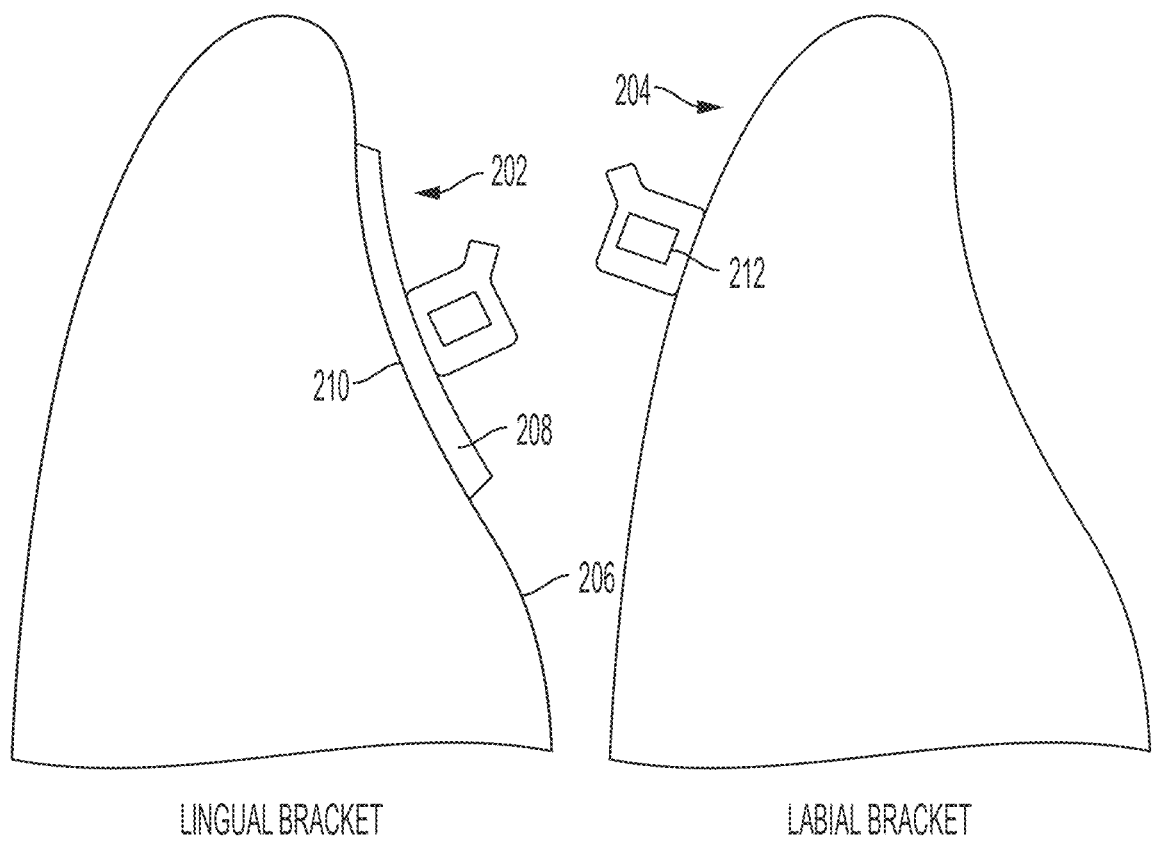
FIG. 2 shows an example of orthodontic tubes connected to a tooth surface, according to some embodiments of the technology described herein.

The tube pad, which holds or connects the tube to the tooth surface, may be designed specifically according to the tooth surface profile, instead of a generalized gridding pattern. The customized tube can meet individual case demand, such as increased anterior labial crown torque required in certain types of cases. FIG. 2 shows an example of orthodontic tubes connected to a tooth surface, according to some embodiments of the technology described herein. As shown in the example of FIG. 2, for the curve on the tooth surface 206, the designed tube's pad (the tooth side of the tube) is matched to the lingual or labial surface of the tooth, as shown for a lingual tube 202 and labial tube 204.

In this example a tube 202 (or 204 herein) having a base surface 208 that is contoured to the shape of tooth 206, such as along a tube/tooth interface 210. The base surface contouring 208 may be configured to match the desired position of tube 202 on the tooth. Any changes in positioning of the tube may require changes in contouring 208. Base 208 may be contoured to the tooth while the tube face and slot 212 may be aligned to a pre-prescribed location that includes variables typically accounted for in an orthodontic tube prescription, including, for example 1) in/out and offset, 2) tip and 3) torque. For example, an in/out position and offset may involve tube thickness and offset relative to a tooth along tube/tooth interface 210. A tip parameter may involve an angulation of slot 212 along a mesio-distal direction. A torque parameter may involve an inclination of slot 212 and/or base 208 relative to a tooth surface so that torque may be applied by an archwire. The tube 300 can accommodate clinical torque values ranging from 0° to −45° and in cases of extreme torque, the tube may adjust internally while maintaining the same base geometry.

Continuing within 106, additional information, such as the desired torque, offset, angulation of select tubes and occlusal/incisal coverage for placement guide is entered.

In 108, the tube (or tubes) is designed by the software based on the input 3D CAD model of the measured teeth, the model of the desired treatment outcomes, and the input additional information. The output of the design process may be a 3D CAD model. Such a 3D CAD model may be designed for a single lingual/labial tube structure, including the tube guide and tube pad in contact with teeth surface, as well as the slots for the ideal position according to the orthodontia requirement, ceramic tube material, and tooth profile.

The pad (bonding pad) of the tube may be less than 0.4 mm thick from the tooth. The tube placement guide may be placed occlusally/incisally to guide the correct placement of the tube on the tooth. Examples of raw materials of the tubes may include powder of high strength oxide ceramics such as Aluminum Oxide (Al2O3) and Zirconium Oxide (ZrO2), or other high strength ceramic compositions or metals.

3D CAD tube structure models are processed to generate manufacturing control data for use by the production equipment. For example, where the ceramic slurry-based AM equipment is used to produce the tubes, the software slices the 3D CAD tube structure models to separate it into thin layers and get the horizontal section model for each layer. Based on this section model, the DLP equipment can directly produce ceramic tubes, ensuring the shape of each layer is consistent with the 3D CAD structure data. For example, the thickness of such layers may be about 20 μm to about 50 μm (micrometers or microns) with a manufacturing accuracy of about 1 μm to about 10 μm by using between-layer additive error compensation.

Returning to 108 of FIG. 1, the 3D CAD tube structure model is transmitted to or imported into a 3D production machine, such as a ceramic slurry-based AM machine and the ceramic tubes are produced.

DLP is another ceramic additive manufacturing (AM) process that works by stacking layers of a photocurable resin with a ceramic oxides such as Aluminum Oxide (Al2O3) or Zirconium Oxide (ZrO2), Nitrides or Silicates solid loading, and followed by a thermal debinding and sintering step. The higher resolution of this process is made possible by the LED light's digital mirror device (DMD) chip and optics used. (Stereo-)Lithography-based ceramic manufacturing (LCM) has improved this process making it more accurate with higher resolution (40 μm) and rigidity. The LCM process involves the selective curing of a photosensitive resin containing homogeneously dispersed oxide or glass ceramic particles that can be fabricated at very high resolution due to imaging systems which enable the transfer of layer information by means of ever-improving LED technology, though a laser may also be used for photopolymerization.

The base of the tube may be adhered to the tooth surface and the tube slot may be matched to the archwire. According to requirements of mechanical properties, different composition of material may be required for the layers during the DLP manufacturing process. After being built up and processed, the tubes may have a gradient and better performance.

In 110, post-processing may then be applied. For example, a thermal treatment (for binder burnout) and a sintering process may be applied to achieve optimal or improved ceramic density. For example, the debinding and sintering phase may include removing the green tube from the device, exposing the blank to a furnace to decompose the polymerized binder (debinding), and sintering of the ceramic material.

In another example, a cleaning or washing treatment may need to be performed to remove all uncured or excess material. The cleaning or washing treatment can be performed when the tube is connected to the build plate, prior to debinding and sintering. In order to accommodate such a process, the tube 300 in FIG. 3A and 400 in FIG. 4A may have a small notch 408 on the mesial side to allow for flow of material (e.g., a cleaning fluid or air) out of the slot during manufacturing, while still allowing sufficient expression of wire torque, as depicted in FIG. 4.

The notch 408 may have a width between 0.1 and 1.5 mm and a height of 0.1 to 1 mm. The notch 408 may extend from any outer face of the tube through the slot. As shown in FIG. 3, the mesial side of the face of the tube includes three edges flat or substantially flat and configured to be releasably connected to the build plate and a fourth edge (i.e., notch 408) manufactured in the buccal surface of the tube. The notch 408 defined in the buccal surface of the tube can be trapezoidal, substantially trapezoidal, square, substantially square, rectangular, substantially rectangular, substantially, elliptical or substantially elliptical in shape. For a trapezoidal or substantially trapezoidal shape, the nonparallel sides of the notch 408 can have a stepped profile.

The ratio of the notch 408 to the slot width can be between 25% and 200%. In some embodiments, the ratio is about 25%, 50%, 75%, 100%, 125%, 150% or 200%. For example, the parallel side can be about 100% of the slot width, and the non-parallel sides can be about 25% or 50%.

Figure 18:
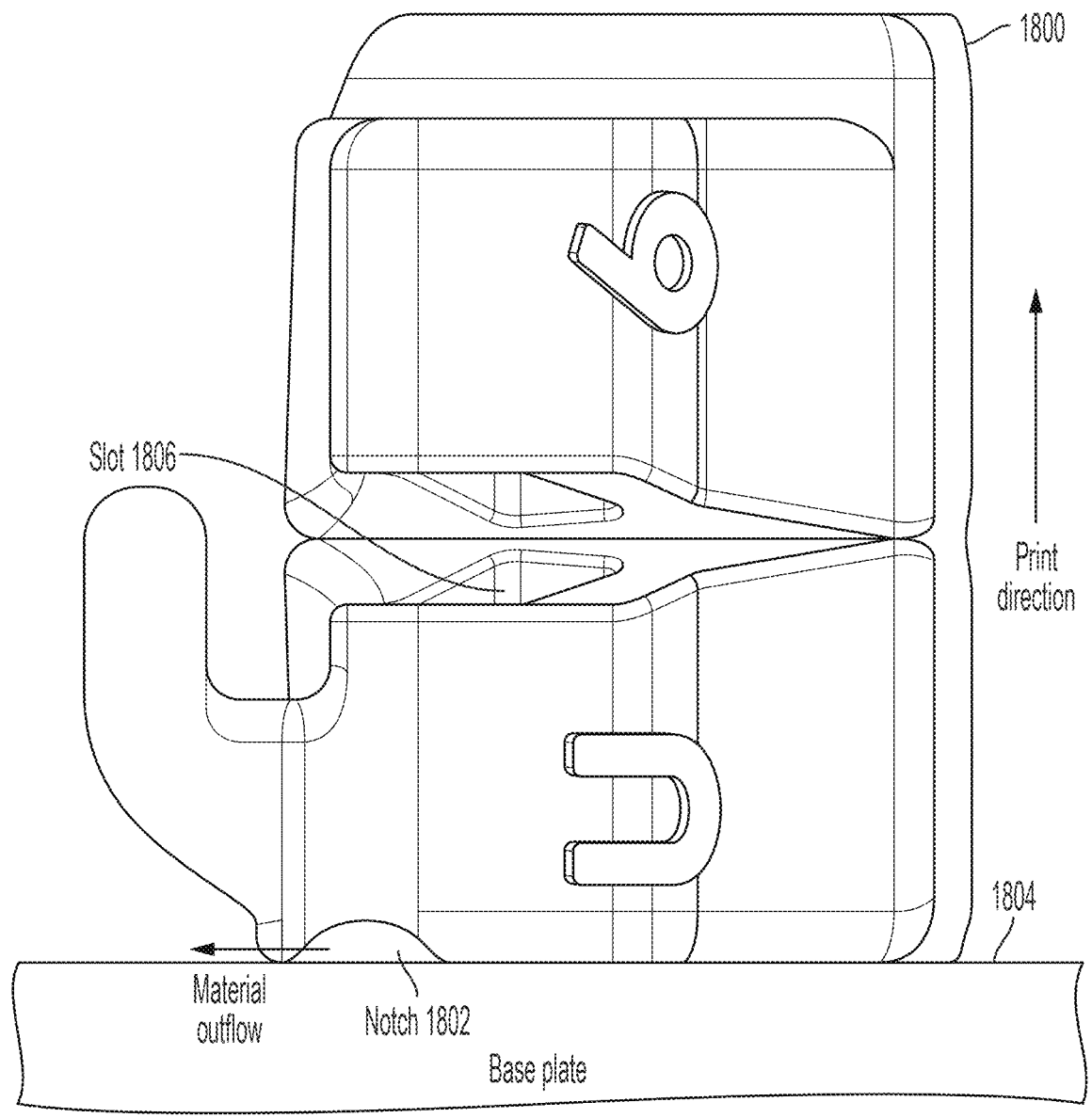
FIG. 18 shows an example orthodontic tube on a base plate, according to some embodiments of the technology described herein.

FIG. 18 shows an example orthodontic tube 1800 on a base plate 1804, according to some embodiments of the technology described herein. For example, the orthodontic tube 1800 may be obtained by AM using a 3D model of an orthodontic tube structure. The orthodontic tube 1800 may have been produced by an AM device in a sequence of layers beginning from a layer closest to the base plate 1804 as indicated by the "Print direction" arrow in FIG. 18. As shown in FIG. 18, the orthodontic tube 1800 includes a notch 1802 in a location in the orthodontic tube 1800 adjacent the build play 1804. The notch 1802 may allow material in the slot 1806 to flow out of the orthodontic tube 1800. For example, after manufacturing, the orthodontic tube 1800 may be attached to the base plate 1804. Material (e.g., cleaning fluid, air, and/or other material) may be applied to the orthodontic tube 1800. The notch 1802 may provide an opening through which the material can exit the slot 1806.

Furthermore, the tube surface may also be processed based on clinical demand.

At 112, the tube is ready to be placed.

Typically, the thickness of the tube pad may be less than 1 mm for lingual tubes and less than 1.5 for labial tubes. Suitable manufacturing materials may include high strength oxides, nitrides and carbides ceramics and metals including but not limited to: Aluminum Oxide (Al2O3), Zirconium Oxide (ZrO2), Alumina-toughened Zirconia (ATZ), Zirconia-toughened alumina (ZTA), Lithium disilicate, Leucite silicate and Silicon Nitride as well as metals such as Stainless Steel 17-4PH or 316 L, Titanium (Ti/Ti-Al6-V4), Cobalt Chromium (CoCr), Tungsten and Tungsten Carbide/Cobalt (W or WC/Co), Silicon Carbide (SiC), Molybdenum (Mo) and precious metals (e.g. gold (Au)). The tube pad may be adhered to the tooth surface with well-known dental adhesives. The tube slot may be matched to the archwire, which may be straight or custom bent. Depending upon the manufacturing process used, different ceramics or composition of powder may be required for the layers. For example, if a selective laser melting manufacturing process is used, an LED light source may be used for the selective curing of a photosensitive resin containing the oxide or glass ceramic particles. Different layers may use different ceramics or compositions of powder.

Figure 3A:
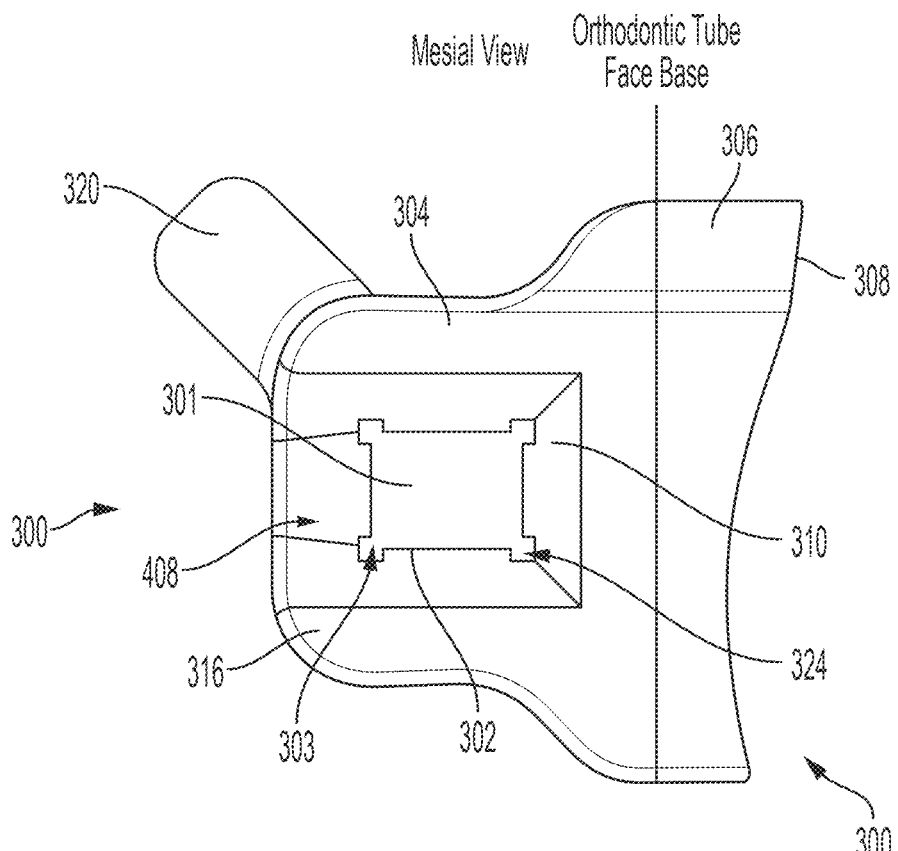
FIG. 3A shows a mesial view of an example orthodontic tube, according to some embodiments of the technology described herein.
Figure 3B:
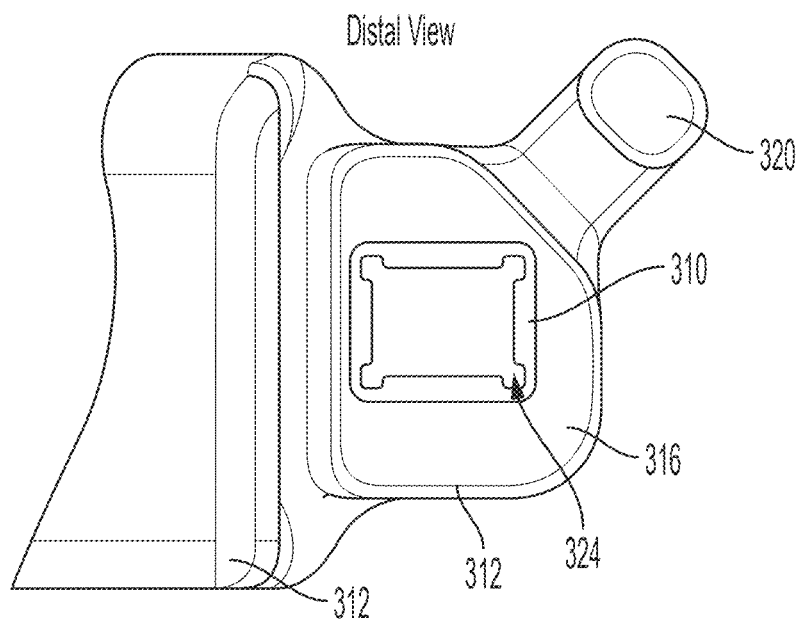
FIG. 3B shows a distal view of the example orthodontic tube of FIG. 3A, according to some embodiments of the technology described herein.

End views of an exemplary printed tube 300 are shown in FIG. 3A (mesial view) and 3b (distal view). In FIG. 3a, the base 306 of the tube is shown to the right (buccal side of the tube) and the face 304 of the tube is shown to the left (lingual side of the tube). Pad 308 is the portion that comes into contact with the tooth, and face 304 includes a first tube body 316 defining a first slot 301, which in some embodiments may be a mesial-distal slot adapted to receive an archwire for applying force to a tooth. The tube 300 may have an occlusal-gingival span between 1.4 mm and 5 mm with a mesial distal span between 2 mm and 8 mm. Tube 300 has filleted edges 312 with radii between 0.05 mm and 1 mm to prevent irritation of cheek or gingival tissue. The filleted edges 312 can be formed on the base 306 and/or the first tube body 316. First tube body 316 can include a hook 320.

The slot 301 may have desired slot wall position 302 and a compensation angle 303 for the walls of slot 301, which may be utilized to counteract shrinkage due to over-polymerization and achieve parallel slot walls 302 of a desired dimension. In some embodiments, slot 301 may be a mesial-distal slot adapted to receive an archwire for applying force to a tooth. Slot 301 may be initially manufactured with a "dovetail" cross-section including compensation angle 303, so that the finished tube may achieve parallel slot walls of a desired dimension, as shown by desired slot wall position 302.

In some embodiments, the dovetail includes mortises 324 defined at each corner of the slot 301. The slot 324 may comprise four walls and four corners. The slot may comprise a mortise in each corner of the slot. A mortise may indicate an area in the 3D model of the orthodontic tube structure where an AM device is to stop polymerization of material. A mortise may thus prevent polymerization of material in corners of a slot during AM of an orthodontic tube. In some embodiments, polymerization locations in a 3D model may be designated by pixels. In such embodiments, an AM device may stop polymerization of material at a pixel corresponding to a mortise in a 3D model. For example, mortises 324 can be formed by turning off pixels of a digital micromirror device in a DLP system so that material is not polymerized at the pixel location. The mortise may reduce over-polymerization of material and, as a result, cause an orthodontic tube produced by AM to have greater precision. The corners of a slot may be less rounded as a result of the mortises.

In some embodiments, the slot 301 may be sized and shaped based on a size and shape of a wire to be received by the slot 301. A 3D model of an orthodontic tube structure may be generated with a slot of the size and shape. For example, the slot 301 on the tube may have high accuracy in size, shape, and angle, and may have low thickness and is designed to accommodate a rectangular wire when completely filled. In some embodiments, slot 301 may be manufactured to any desired size and shape. In some embodiments, slot 301 is manufactured with a greater depth than height or width. In some embodiments, slot heights may vary between 0.016 and 0.024 inches while width may be between 0.020 and 0.035 inches.

In some embodiments, the mesial and distal ends of the slot may be chamfered 310 to allow for easier insertion of an orthodontic wire. In some embodiments, the angle of the chamfer 310 may be between 20° and 80° from the mesial face. A chamfered slot may comprise a slot surrounded by walls with ends of the walls angled relative to a mesial surface of the tube. In some embodiments, a chamfered slot may facilitate insertion of wire into the slot. A chamfered slot may reduce force opposing insertion of a wire through the slot. In some embodiments, an end of one wall of a slot may be chamfered at a different angle than an end of another wall of a slot. In some embodiments, ends of all the walls of the slot may be approximately the same.

In some embodiments, the base 306 of the tube may have different height because of the selected material or desired orthodontic result. Likewise, the pad 308 of the tube may highly match the tooth surface and maximize the tooth contact surface. This may allow for more accurate tube placement by the clinician and better bond approximation to the tooth. Also, because each slot has its own position and shape to cooperate with the archwire, twisting error may be minimized and improved orthodontic result may be actualized. In a number of embodiments, these features may be manufactured as one piece and that the customization of the slot relative to the tooth may be a function of the slot changing position or the tube base moving. In many embodiments, no machining of the features is required to produce a suitable tube.

In some embodiments, a mesial surface of a tube 300 includes a pad 308 and a first tube body 316 connected to pad 308. The first tube body 316 defines a slot 301, chamfers 310 defined in the gingival, lingual and occlusal edges of the mesial surface, and a notch 408 formed in the buccal edge of the mesial surface. Pad 308 is configured to be a negative of the tooth surface. Chamfers 310 extend at an inward angle from the edges to the slot wall. Mortises 324 are formed at the intersections of adjacent slot walls. Chamfers are formed by one or more edge surfaces of the notch 408 extending at an inward angle to the slot wall. In the embodiment shown in FIG. 3A, the notch edge opposing the mesial surface is chamfered and extends at inward angle to the slot wall and the nonparallel side edges of the notch 308 extend inward from the mesial surface to the notch edge opposing the mesial surface. Hook 320 is connected to the first tube body 316 at the intersection of the gingival and buccal surfaces of the first tube body 316. In some embodiments, hook 320 can be formed on the buccal surface.

Figure 4A:
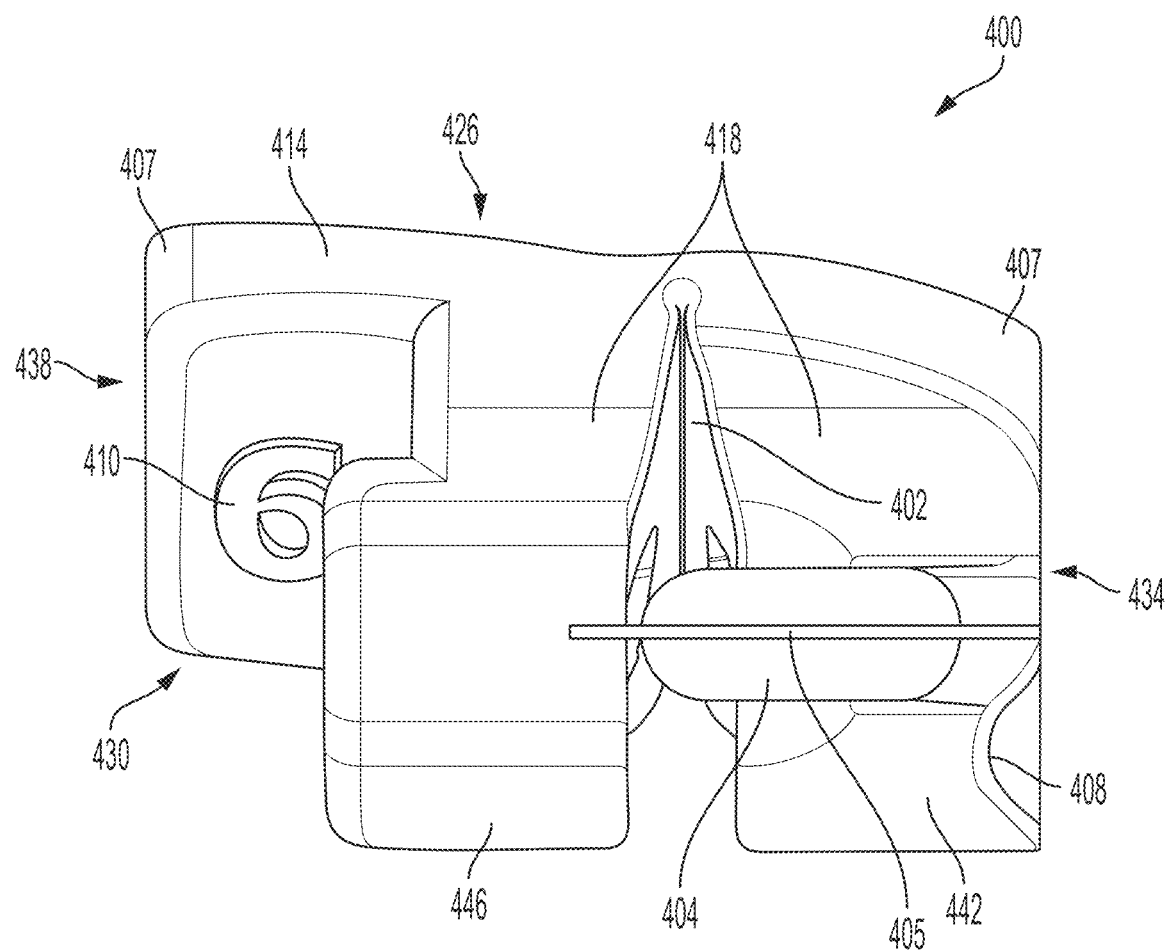
FIGS. 4A-4B show views of an example orthodontic tube including a stress concentrator, according to some embodiments of the technology described herein.
Figure 4B:
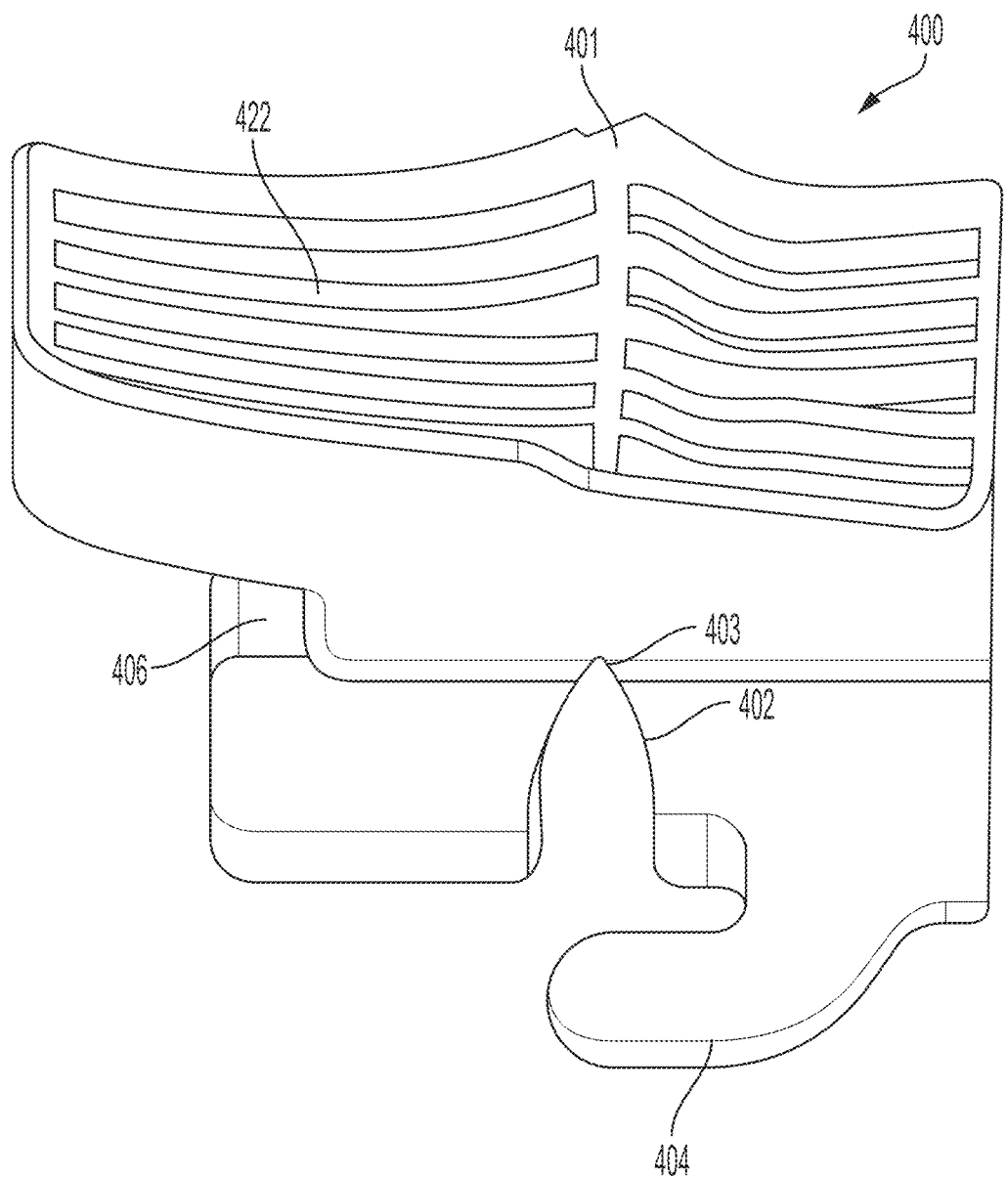
Figure 4C:
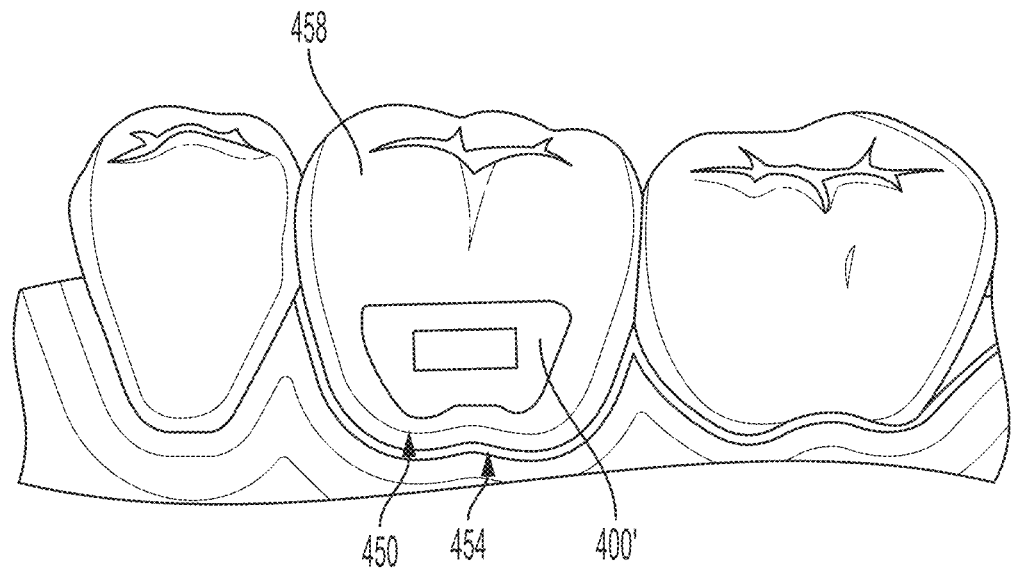
FIG. 4C shows an orthodontic tube with a gingival edge curved to approximate a gingival margin of a patient's tooth, according to some embodiments of the technology described herein.

As depicted on the tube 400 face in FIG. 4A, the tube 400 may have a notation 410 imprinted in the tube to denote which tooth it should be placed on. This notation 410 may be on any surface of the tube and may have a width between 0.5 and 4 mm, and a height range from 0.5 to 4 mm. The notation's depth may be up to 1 mm. This notation 410 may include any form of number, letter, character or polygon or combination therein. In a variation of the design the notation may be raised/embossed from the tube's surface.

Tubes 400 may further include an attachment such as a hook 404 that provides the capability to use additional delivery systems such as elastomers, springs or other attachments that create vectors of force. In a number of embodiments, these features may be manufactured as one piece, protruding from any pre-designed area to create the proper force vectors desired. Hook 404 can be a curved hook, a straight hook or a ball hook. The hook 404 may have a configurable, custom angle to meet the patient's demands, the doctor's prescription and help to avoid irritation of the gums or of the cheek. FIG. 4A depicts this configurability via a plane 405 of the hook 404 which divides the hook into symmetrical halves.

In some embodiments, the hook 404 may be angled. For example, the hook 404 may be angled to avoid contact of the hook 404 with a portion of a patient's mouth (e.g., cheek and/or gums) when the orthodontic tube is placed in the patient's mouth. A system generating a 3D model of an orthodontic tube structure may be configured to determine an angle of the hook 404, and generate the 3D model of the orthodontic tube structure to include a hook of the determined angle. In some embodiments, the plane 405 of the hook can be angled between 90° labially and 30° lingually from the face of the tube 400 and can be angled up to 45° in either direction from the direction of the slot. The end of the hook 404 can be angled up to 45° away from the body of the tube 400 in the plane 405 of the hook. Although tubes 300 and 400 are shown with hooks, tubes may be formed without hooks.

Tube 400 includes a base 414 and a face 418. Base 414 includes a pad surface 422, a gingival edge 426, an occlusal edge 430, a mesial edge 434, and a distal edge 438. The face 414 defines a slot extending therethrough. The face 418 includes a split tube body including a first tube body 442 defining a first slot extending therethrough and a second tube body 446 defining a second slot extending therethrough. Pad 422 is configured to be a negative of the tooth surface. Pad 422 includes retention features as further described with reference to FIGS. 9 and 10.

Tubes 400 may also include a cutout 406 behind the slot on the distal end to accommodate attachment or retention of elastomerics, ligature ties, springs or other attachments that create vectors of force. The cutout 406 can be defined between the base and the tube body (e.g., tube body 316 or second tube body 446). The cutout 406 may have a mesial-distal span between 0.1 mm to 1 mm and a labial-lingual dimension between 0.2 mm and 1.5 mm. The cutout 406 can run the occlusal-gingival range of the tube, or be formed along only a portion of the range to, for example, form a rounded end.

In some embodiments, a nub or protrusion is formed on the distal end of the second tube body 446 to assist with attaching or retaining elastomerics, ligature ties, springs or other attachments.

As shown in FIG. 4, tube 400 includes two separate cuts made along the central line of the tube running occlusal/gingivally, which will allow the tube to reliably fracture and debond when mesial/distal pressure is applied. The first 401 is cut along the base, and includes a custom contoured polygon that matches the tooth shape which is consistently cut to a depth of up to 0.3 mm from the tooth surface. This polygon has a width greater than 0.1 mm and up 75% of the tube width. The second 402 is the stress concentrator cut from the front of the tube. This second cut shape has smoothed edges to avoid trapping intro-oral debris and may be angled between 0° and 45° towards the mesial face of the tube. This shape comes to a peak in order to provide for consistent fracturing at the desired location. Depending on the specifics of the tooth morphology, the tube prescription, and the desired strength, the cut 403 can be started anywhere from 0.1 mm to 1.2 mm from the tooth and extend the remainder of the tube structure. This cut can have a final width which can range from 5% to 50% of the tube width. The curve of the cut 403 of the shape in the gingival/occlusal direction perfectly matches the curvature of the tooth along the same line. This shape is created by a combination of thickening and Boolean operations based on the distance field of the tooth, and its relationship with the tube. The specifics of the location and thickness of the shape are determined by calculating the in-out of the tube, and using this value in algorithms determined through experimental testing in order to provide the optimal tube strength.

As described herein, in some embodiments, an orthodontic tube may include a debonding structure comprising a stress concentrator. In some embodiments, the debonding structure may be customized based on a 3D model of a patient's tooth. The stress concentrator may be shaped such that the orthodontic tube fractures in response to a force applied to the stress concentrator. For example, the stress concentrator may fracture in response to a normal force of 35 to 40 Newtons. In some embodiments, the stress concentrator may run along an occlusal-gingival direction of an orthodontic tube. In some embodiments, the stress concentrator may include a portion that has a substantially triangular cross-section.

Figure 19:
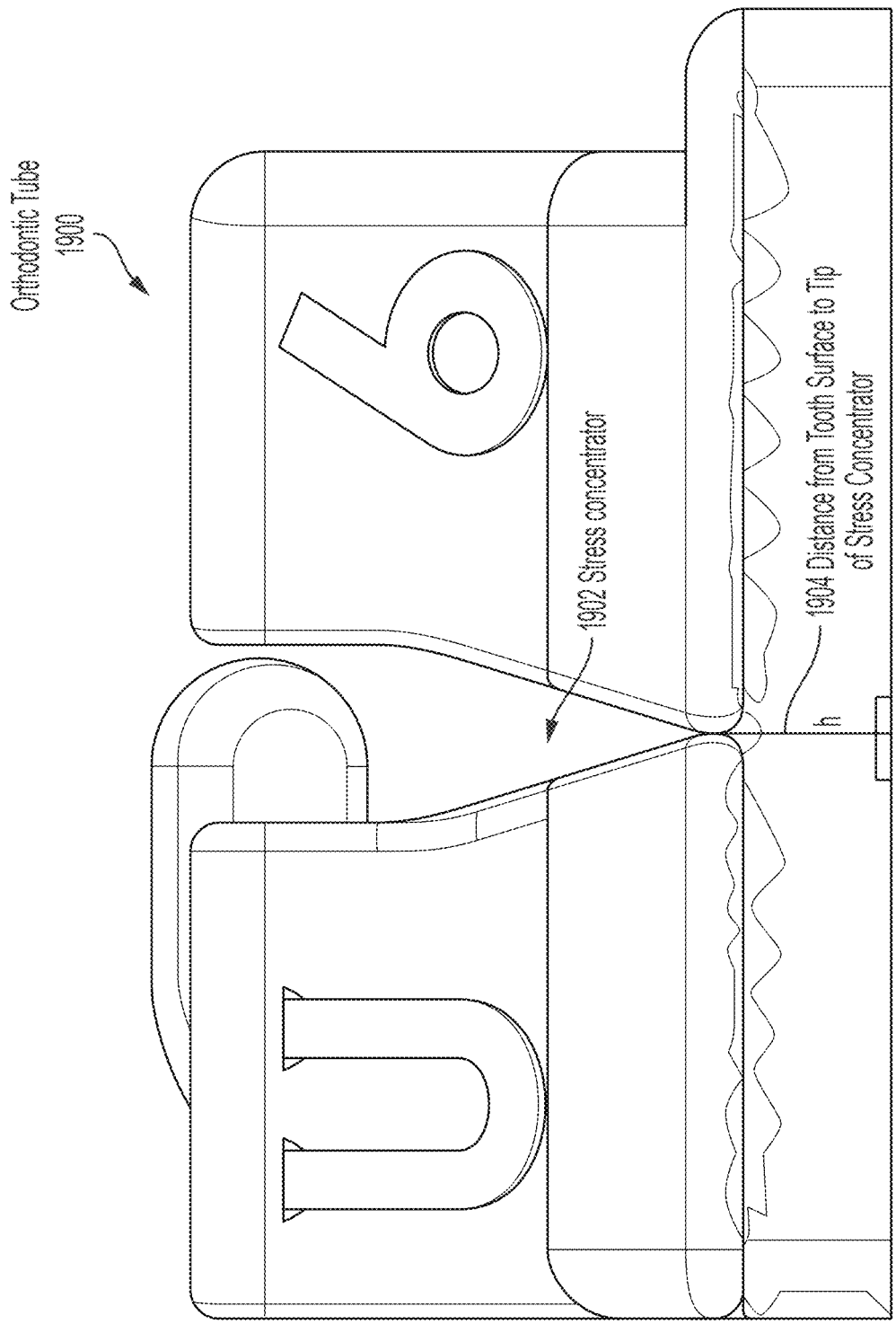
FIG. 19 shows an example orthodontic tube with a stress concentrator, according to some embodiments of the technology described herein.

FIG. 19 shows an example orthodontic tube 1900 with a stress concentrator 1902, according to some embodiments of the technology described herein. As shown in FIG. 19, the stress concentrator 1902 has a tip at a distance 1904 from a tooth surface. The stress concentrator 1902 then extends into an approximate V-shape from the tip. In the example of FIG. 19, a normal force applied on both sides of the stress concentrator 1902 may cause the orthodontic tube 1902 to break, and thus debond from a patient's tooth. In some embodiments, a distance over which the stress concentrator 1902 widens may be determined based on a desired a size of any flat overhangs. In some embodiments, a maximum width of the stress concentrator 1902 may be determined based on a desired steepness of walls of the stress concentrator 1902.

As shown in FIG. 4, in some embodiments, the gingival corners 407 of tube 400 are rounded to account for the keratinized/attached gingiva, which can interfere with the bonding surface. The roundness and radius of these corners may be changed from patient to patient, and within a case, from tooth to tooth. In some embodiments, a radius of curvature for gingival corners may be determined based on a 3D model of a patient's tooth. In some embodiments, the roundness and radius, and/or placement relative to the gingival margin and/or occlusal edge of the teeth is determined by the patient's prescription and/or based on a doctor's preference to affect a smile arc. Tubes with custom formed edges can be placed closer to the gingival margin or the occlusal edge than can be a stock tube with a stock base. In some embodiments, a radius of curvature of rounded gingival corners 407 may be in a range of 0.05 to 2.0 mm, inclusive. FIG. 4C shows tube 400' having a gingival edge 450 curved to approximate the gingival margin 454 of a patient's tooth 458.

Figure 4D:
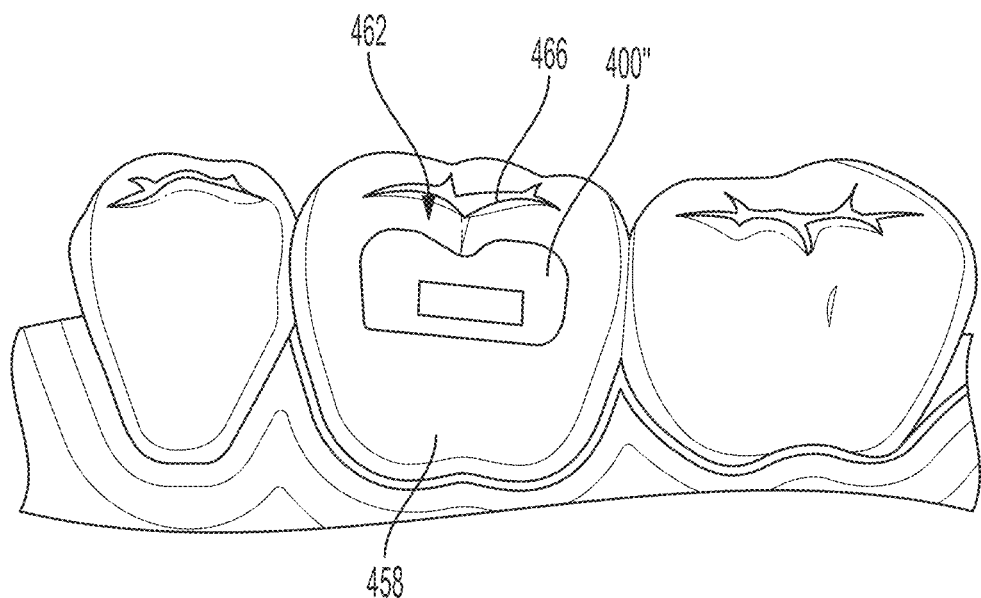
FIG. 4D shows an orthodontic tube having an occlusal edge curved to approximate an occlusal surface of a patient's tooth, according to some embodiments of the technology described herein.

As illustrated in FIG. 4D, in some embodiments, an occlusal edge of an orthodontic tube can be curved or rounded. FIG. 4D shows tube 400" having an occlusal edge 462 curved to approximate the occlusal surface 466 of a patient's tooth. The radius of curvature of the occlusal edge may be customized for a patient and/or for a tooth. In some embodiments, a radius of curvature for an occlusal edge may be determined based on a 3D model of a patient's tooth. IN some embodiments, the radius of curvature and/or placement relative to an occlusal edge of the tooth may be determined by a patient's orthodontic prescription and/or a doctor's preference to affect a smile arc. Tubes with a curved occlusal edge may be placed closer to an occlusal edge than stock tubes. In some embodiments, a radius of curvature of a curved gingival edge may be in a range of 0.05 to 2.0 mm, inclusive.

In some embodiments, an orthodontic tube may include a gingival edge curved to approximate the gingival margin of a patient's tooth and an occlusal edge curved to approximate the occlusal surface of the patient's tooth.

Figure 5:
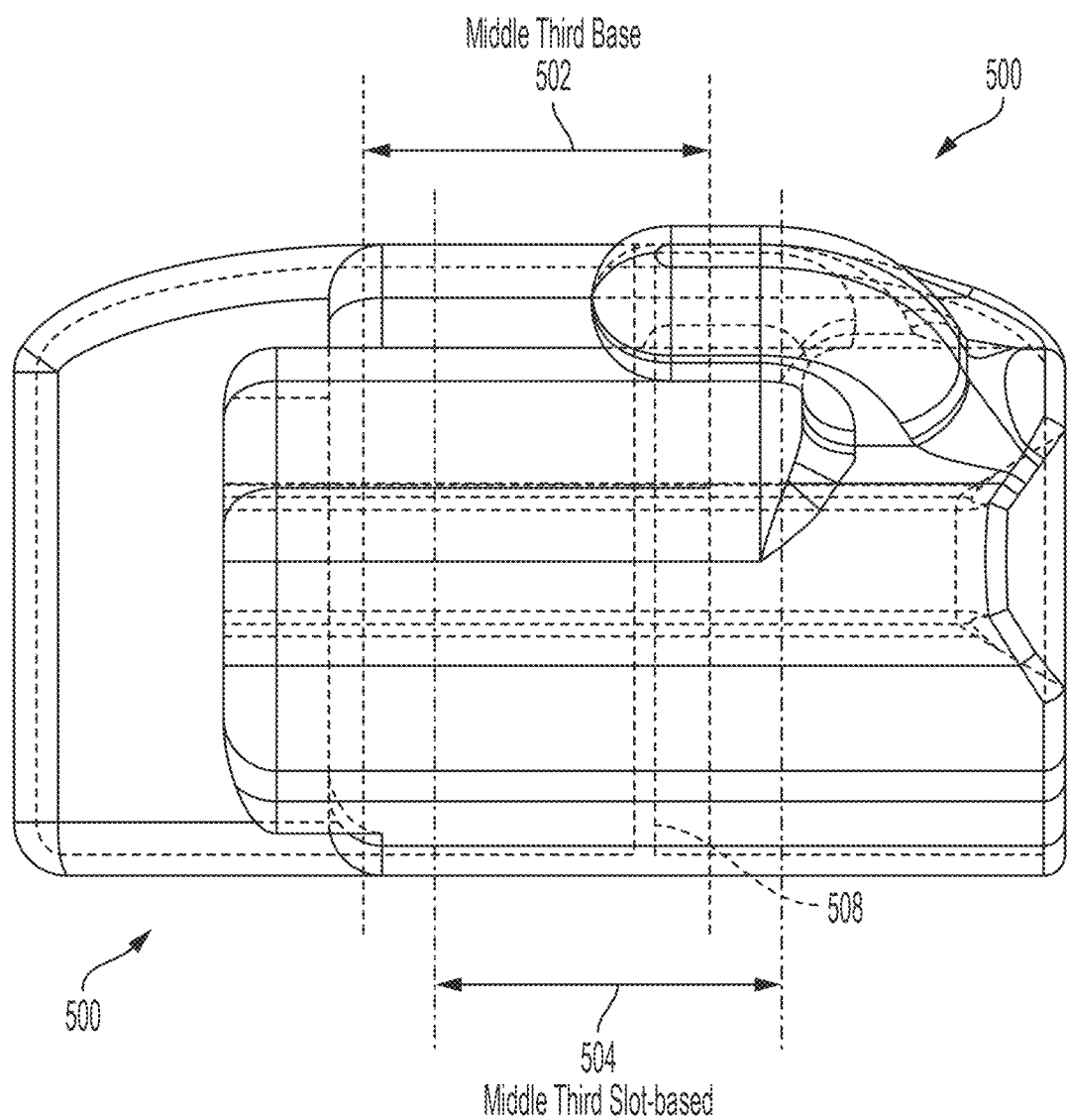
FIG. 5 shows an example orthodontic tube as viewed from a face of the tube, according to some embodiments of the technology described herein.

An example of an orthodontic tube 500 is shown in FIG. 5, as viewed from the face of tube 500. In this example, the middle third 502 as defined by the base or overall dimension and the middle third 504 as defined by the dimension of the area of the tube 500 with the slot, are indicated. A fracture groove 508 may be manufactured within the middle vertical third (502 or 504) of the ceramic tube 500.

Figure 6:
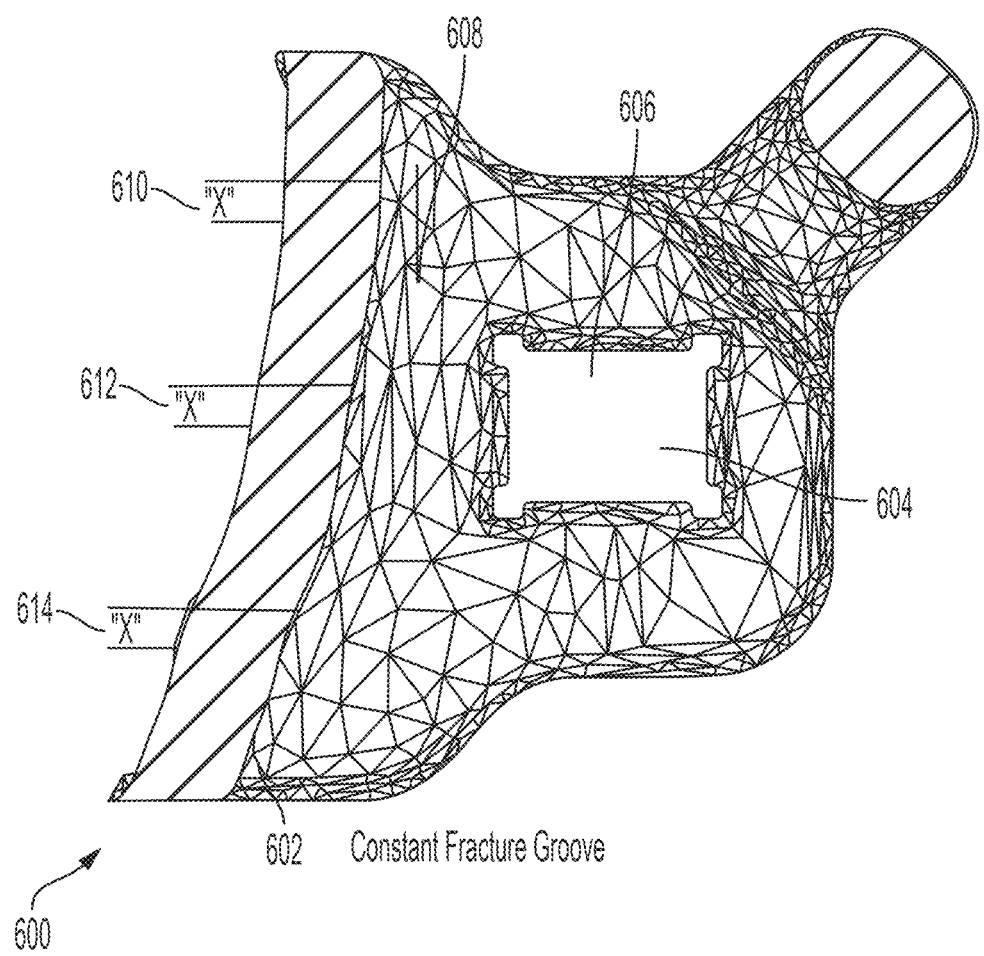
FIG. 6 shows a cross-sectional view of an example orthodontic tube including a fracture groove, according to some embodiments of the technology described herein.

An example of an orthodontic tube 600 is shown in FIG. 6, in a cross-sectional view. In the example shown in FIG. 6, a fracture groove 602, horizontal (mesial-distal) slot 604, and auxiliary slot 606 are shown. Fracture groove 602 may include a weakened area including a tooth curved depression (groove) in the tube base 608 running vertically (in the occlusal-gingival direction) within the middle third of tube 600. Fracture groove 602 may match the contour of the tooth for that portion of the tube positioning. Fracture groove 602 may align with the vertical midline of the tube or base and/or deepest portion of auxiliary slot 606. The tube area between these features may form the weakened area of tube 600.

In some embodiments, fracture groove 602 may be constant in depth from the tooth surface, as shown in FIG. 6. In some embodiments, constant depth fracture groove 602 may be a nominal or predetermined depth for some or all tubes for a patient. For example, groove depths 610, 612, and 614 may all be the same predetermined depth "X". Such nominal or predetermined depth may be in a range of, for example, 0.10 mm to 1.2 mm, inclusive. In some embodiments, constant depth fracture groove 602 may be a depth that is different for some or for each tube and may be based on the in-out of the tube. For example, a distance from the tooth surface to the deepest part of fracture groove 602 may differ for different tubes.

Figure 7:
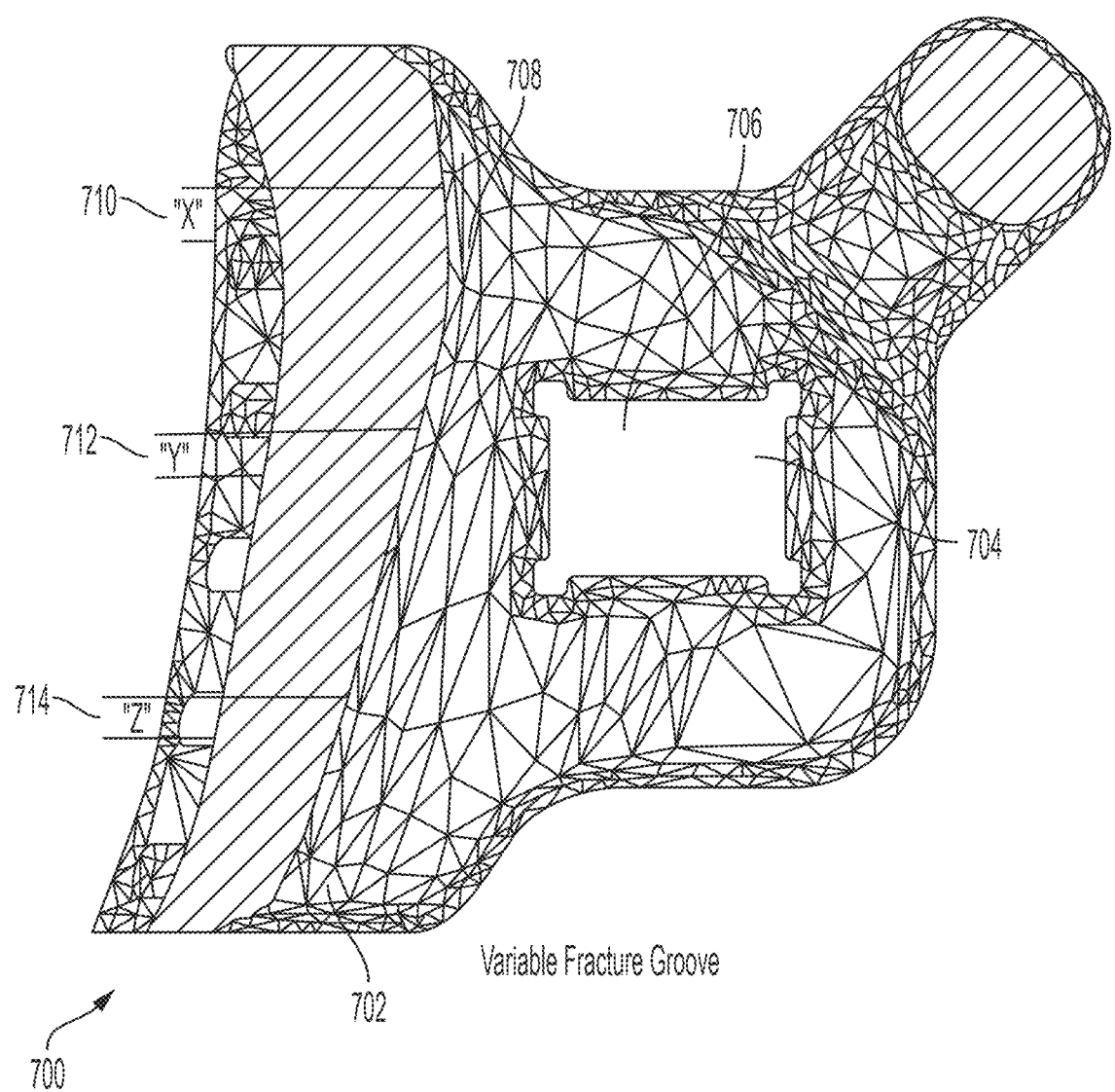
FIG. 7 shows a cross-sectional view of an example orthodontic tube including a fracture groove with variable depth, according to some embodiments of the technology described herein.

An example of an orthodontic tube 700 is shown in FIG. 7, in a cross-sectional view. In some embodiments, fracture groove 702 may be variable in depth from the tooth surface, as shown in FIG. 7. In some embodiments in which fracture groove 702 is variable, the variance may have a range of up to 50% of the distance from the tooth surface to the deepest part of fracture groove. For example, groove depth 710 may be depth "X", groove depth 712 may be depth "Y", and groove depth 714 may be depth "Z". In some embodiments, variable depth fracture groove 702 may have a nominal or predetermined maximum depth for some or all tubes for a patient. Such as nominal or predetermined maximum depth may be in a range of, for example, 0.10 mm to 1.2 mm, inclusive. In some embodiments, constant depth fracture groove 702 may have a maximum depth that is different for some or for each tube. For example, a distance from the tooth surface to the deepest part of fracture groove 702 may differ for different tubes.

Finite-element analysis has revealed that mesial-distal forces on the side of the tie-wings or edges of the tube results in a concentration of forces in the middle third of the tube base. In some embodiments, fracture groove 602 may be defined as an area of removed material from where such forces would have been most concentrated. The addition of fracture groove 602 lowers the forces required to predictably create a tube fracture down the middle vertical third of the tube, which aids in debonding the ceramic tube from the tooth. The weakened area and the fracture force can be optimized by adjusting the dimensions of the groove and/or the auxiliary slot.

The algorithm can be altered to allow a different force value based on a doctor's preference or if the force value is too high or low for a given patient population. Adolescents often do not follow best practices for orthodontic treatment, in which case a higher debond force value can be used to ensure tubes do not debond early due to abnormal mastication forces, i.e., biting on a pen. In cases where adults may not have these issues and orthodontists may prefer to not have to use a higher force to debond, the feature need not be tuned.

The benefit of this invention is the improvement of consistency in the debonding force for customized tubes. By linking the shape of the stress concentrator to the shape of the tooth, and controlling the depth of this stress concentrator by the thickness of the bracket or tube, a more reliable breaking force can be achieved. This improved breaking force consistency allows for a more positive experience, particularly when debonding a sequence of brackets or tubes all at once. Additionally, it allows for improved tuning of the exact strength if it is found that the currently set strength is too low or high.

This auxiliary slot/stress concentrator can be applied to a variety of orthodontic appliances such as brackets, tubes or attachments. Curved tie wing edges can be applied to increase structural integrity and manufacturability and the slope of auxiliary slot into fault line can be designed to decrease layer separation for high quality manufacturability. A channel in the base 210 can also be curved to the shape of the tooth and act as a stress concentrator point as well as an egress channel for excess bonding material.

By varying the tie-wing, slot enclosure, and slot designs, the same feature (fracture groove) could conceivably be created traveling in the mesial/distal direction, or on a diagonal between the two directions. Altering this direction could reduce the risk of tube debonding when using high force attachments such as 3M Forsus springs or other orthodontic functional appliances or class II/III "bite correctors".

Variations of the invention include alternate shapes for the stress concentrator itself, as well as changing the direction of the stress concentrator. The shape of the channel 202 could also be altered while remaining custom contoured to provide different force profiles, to avoid food traps and increase cleanliness, or to strengthen the structural integrity of the tube. Another improvement area would be adjusting the design to allow orthodontists to debond tubes with a standard utility plier (e.g., Weingart or Howe pliers) or novel specialty plier while the wire is still engaged. This would ensure patients do not accidentally swallow tubes during debond and would highly increase the efficiency of the debonding process. In this scenario the algorithm, shape of the channel, as well as the location of the channel could be adjusted.

This improved stress concentrator uses a profile with a peak, however, circular, rectangular, or another other closed shape may be used as the profile for the stress concentrator. Additional shapes may be useful in tuning the exact strength of the tube, as well as providing easier pathways for manufacturing.

Figure 8:
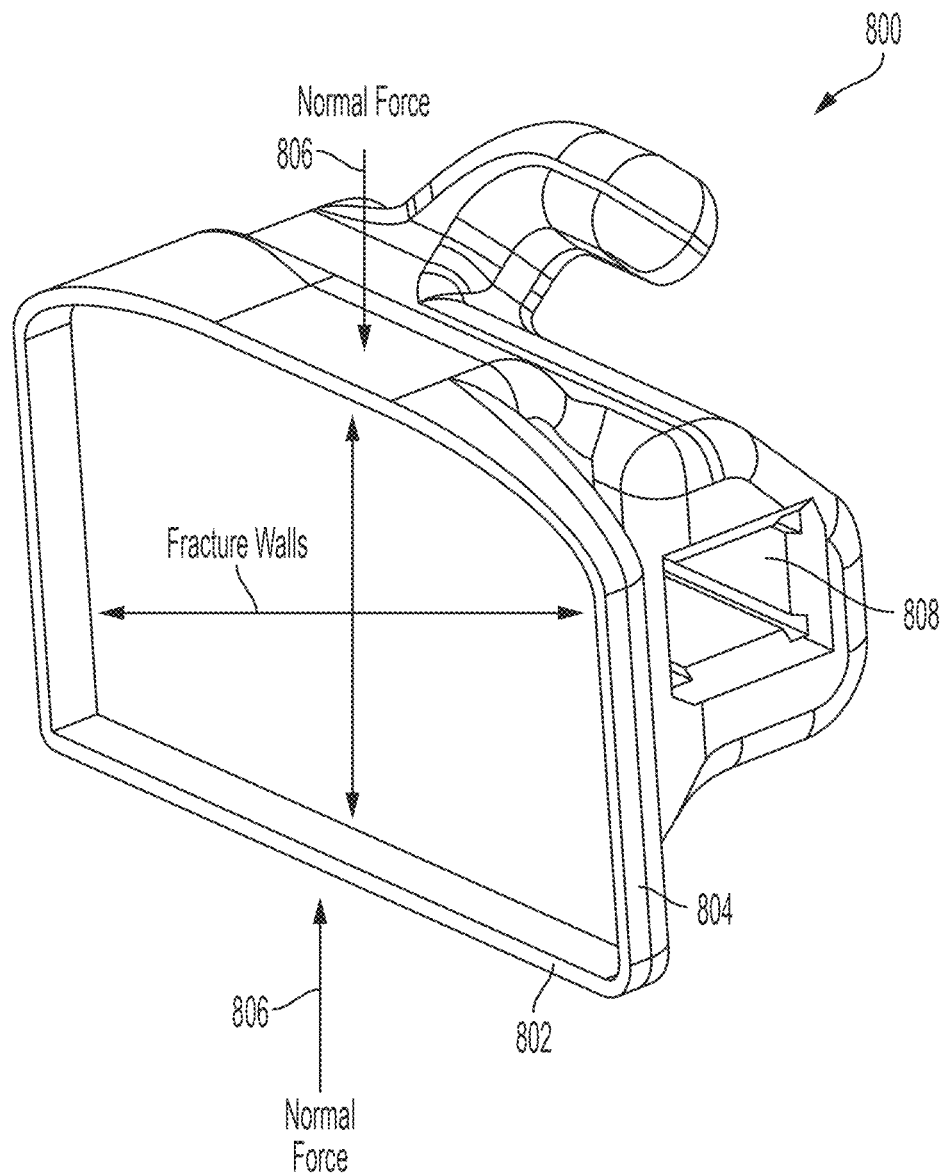
FIG. 8 shows an example orthodontic tube with fracture walls, according to some embodiments of the technology described herein.

An example of an orthodontic tube 800 is shown in FIG. 8. In this example, a fracture wall 802 may be manufactured around the perimeter of the base 804 of tube 800. In some embodiments, fracture wall 802 may have a consistent thickness, which may be in a range of 15-140 μm, inclusive. In some embodiments, fracture wall 802 may have a varying thickness, which may be in a range of 15-140 μm, inclusive. In some embodiments, bonding cement may be inserted into the cavity formed by fracture wall 1002. In some embodiments, the wall thickness may be consistent around all edges of tube 800, enabling a normal force 806 (the component of the contact force that is perpendicular to the surface of fracture wall 802) to be applied in any direction, such as mesial-distal, occlusal-gingival, or to any opposite corners. The continuity of fracture wall 802 around the entire tube may provide predictable fracture of the wall via pliers, enabling debonding of the tube though a combination of tensile and peeling forces, which is typically less than the shear bond strength of a bonded tube. For example, pliers may be used that may, moving around the ligated wire, induce a mesial-distal force 806 on the labial portion of the tube. In some embodiments, such force may be in the range of 10-180 Newtons, inclusive. Also shown in this example is the slot 808 (archwire/mesial-distal slot).

Figure 9:
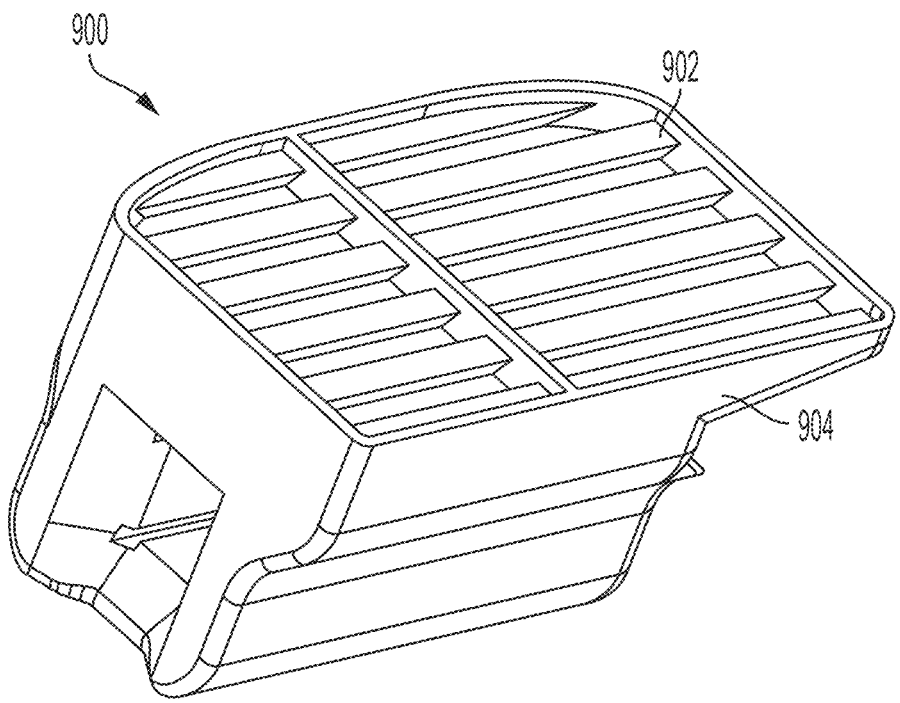
FIG. 9 shows an example orthodontic tube with retentive structures, according to some embodiments of the technology described herein.
Figure 10:
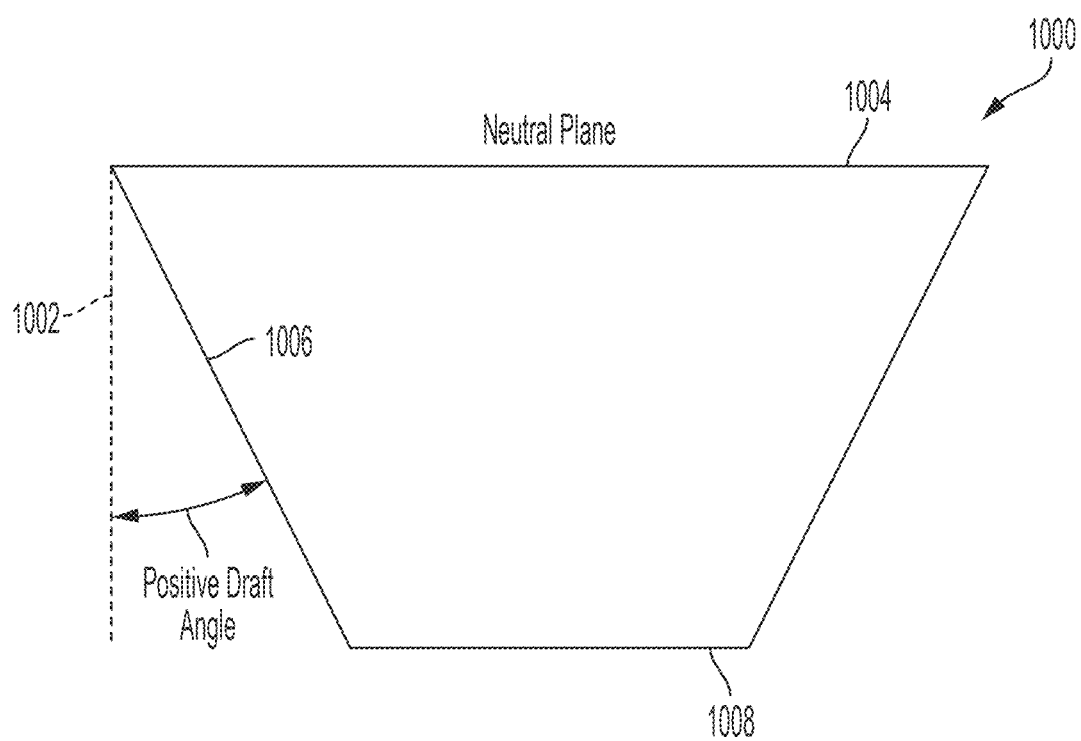
FIG. 10 shows a cross-section of an example retentive structure, according to some embodiments of the technology described herein.

An example of an orthodontic tube 900 is shown in FIG. 9. In this example, plurality of retentive structures 902 are shown included in base 904 of tube 900. An example of a retentive structure 1000 is shown in FIG. 10, in cross-section. In some embodiments, retentive structure 1000 may be of any shape which is a three-dimensional figure with a positive draft angle greater than 0°. Draft angle 1002 may be an angle between a perpendicular to neutral plane 1004, which may be oriented toward a tooth structure or surface, and a sidewall 1006 of retentive structure 1000. In some embodiments, in cross-section, retentive structure 1000 may be generally trapezoidal, with a neutral plane 1004, which may be a plane oriented toward a tooth structure or surface, being wider than a base plane 1008, which may be a plane on a side of the retentive structure 1000 oriented toward a tube body. Neutral plane 1004 may be flat or may be contoured to the shape of the tooth surface to which it is meant to be bonded. In some embodiments in which a neutral plane 1004 of each retentive structure is flat, neutral planes 1004 of all retentive structures may be parallel to base plane 1008, or a neutral plane 1004 of some or all retentive structures may not be parallel to base plane 1008, such that the overall pattern of retentive structures may be generally contoured to the tooth surface. Further the parallel or non-parallel alignment of neutral plane 1004 and base plane 1008 may affect the draft angle 1002 for each retentive structure 1000. While suitable retention may be achieved with bonding cement, a range of designed draft angles 1002 may be utilized to compensate for the limitations of particular three-dimensional printing processes. For example, to achieve a desired final draft angle, the design of the digital file's draft angle may need to be increased to compensate for over-polymerization, polymerization-shrinkage and any other compensations. If a zero or positive draft angle is achieved from the actual printed part (regardless of the digital file design), suitable retention should be achievable.

In the example shown in FIG. 9, retentive structures 902 are shown as semilunar lines or "trenches". However, in some embodiments, retentive structures 902 may be semilunar cones, full-circle cones, squares, rectangles, retentive lattices or meshes, or any other shape having a positive draft angle at any point meant to enhance bond strength. Such shapes having a positive draft angle may be more efficiently manufactured by three-dimensional printing rather than by injection molding or casting methods.

Figure 11:
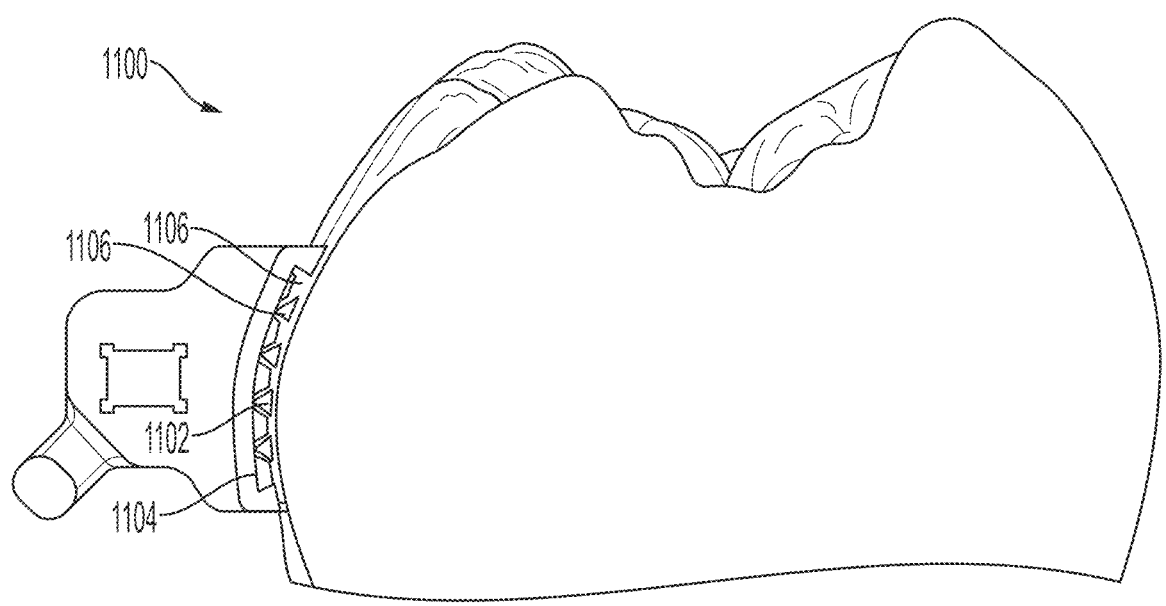
FIG. 11 shows a cross-section of an example orthodontic tube on a tooth, according to some embodiments of the technology described herein.

An example of a cross-section of an orthodontic tube 1100 on a tooth is shown in FIG. 11. In the example shown in FIG. 11, the retentive structures 1102 are shown contoured to the tooth surface (as shown in a three-dimensional vector (e.g. stl or additive manufacturing file format (AMF) representation). Each structure may be contoured to fit its corresponding area of tooth surface within the prescribed tube position. In this example, base cavity 1104 is also shown as contoured to ensure each retentive structure maintains its dimensions and all structures have a similar depth. Further, a depth 1106 of contoured cavity 1104 may be defined. An example of this process can be found in US Patent Publication No. 20190328493A1, the contents of which are hereby incorporated by reference herein.

An advantage of forming tubes using an AM process is that the tube has a unibody construction, meaning the tube is formed as a single structure based on a prescription. To achieve customization, a tube face need not be formed separately from a tube pad, followed by bonding of the tube face to the tube pad. A custom, unibody tube can apply force with more precision, resulting in more predictable treatment outcomes, and in many cases, fewer visits to an orthodontist for adjustments or wires or brackets or tubes.

In some embodiments, an orthodontic tube may include a slot with a customized angle of a main portion of the slot. For example, the customized angle may be based on an orthodontic prescription. A system generating a 3D model of the orthodontic tube structure may be configured to determine an angle of the main portion of the slot based on the orthodontic prescription, and generate the 3D model of the orthodontic tube structure with a slot having the determined angle. In some embodiments, an angle of the main portion of the slot can be modified by forming the slot at an angle relative to a longitudinal axis of the tube and/or rotated relative to the longitudinal axis. A prescribed force can be applied to a tooth via a tube having a slot that is formed at an angle relative to a longitudinal axis of the tube or rotated relative to the longitudinal axis of the tube. For example, slot angle or rotation in combination with an archwire can be used to tip, torque, rotate or move in/out one or more teeth.

Figure 12A:
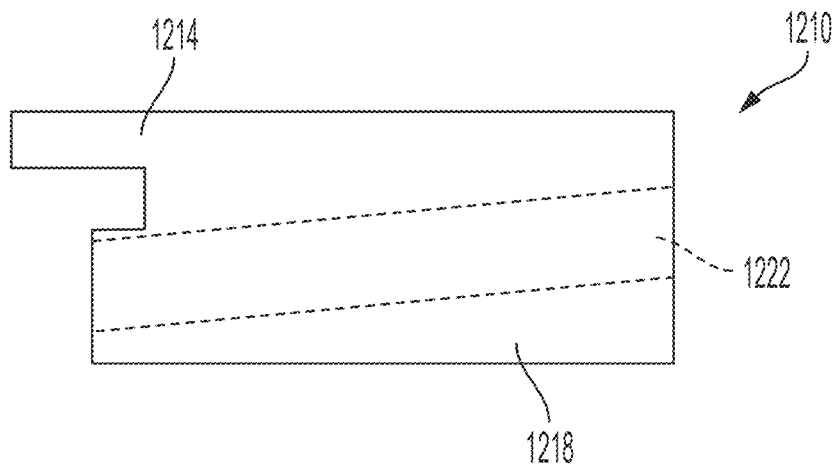
FIG. 12A shows a gingival or occlusal view of an example orthodontic tube, according to some embodiments of the technology described herein.

FIG. 12A (gingival or occlusal view) shows a tube 1210 having a base 1214 and a face including a tube body 1218. The slot 1222 defined in the tube body 1218 is formed at an ascending angle relative to base 1214 along the mesial-distal longitudinal axis. In some embodiments, the slot 1222 defined in the tube body 1218 is formed at a descending angle relative to base 1214 along the mesial-distal longitudinal axis. Slot 1222 can cause rotation of the tooth.

Figure 12B:
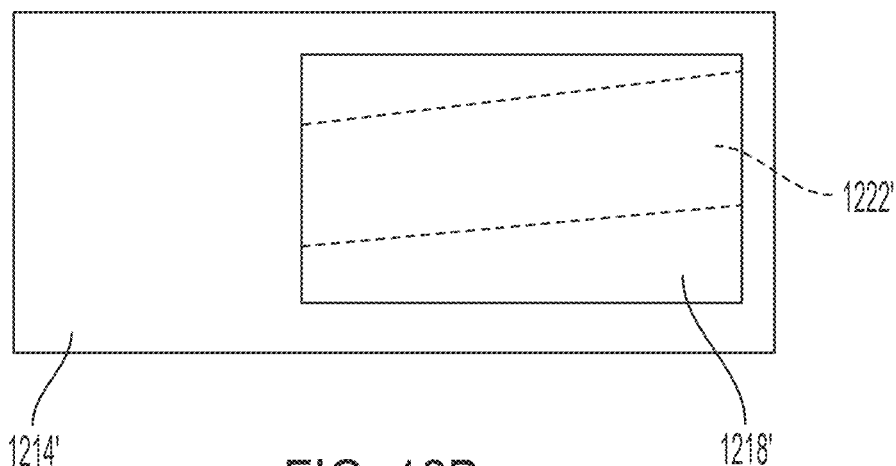
FIG. 12B shows a buccal view of an example orthodontic tube, according to some embodiments of the technology described herein.

FIG. 12B (buccal view) shows a tube 1210' having a base 1214' and a face including a tube body 1218'. The slot 1222' defined in the tube body 1218' is formed at an oblique angle relative to the mesial-distal longitudinal axis. In certain embodiments, the angle can be tipped from gingival edge to occlusal edge or from occlusal edge to gingival edge. Slot 1222' can cause tipping of the tooth.

Figure 12C:
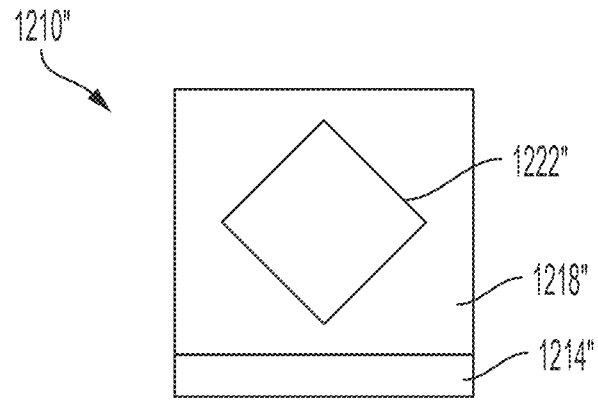
FIG. 12C shows a mesial or distal view of an example orthodontic tube, according to some embodiments of the technology described herein.

FIG. 12C (mesial or distal view) shows a tube 1210" having a base 1214" and a face including a tube body 1218". The slot 1222" defined in the tube body 1218" is rotated along the longitudinal axis. The slot 1222" can be rotated clockwise or counterclockwise between 0.1 degrees and 45 degrees relative to the longitudinal axis. Slot 1222" can cause torque of the tooth.

In some embodiments, the slot can have a cross-section that is square, substantially square, rectangular or substantially rectangular. In some embodiments, the slot can have a cross-section that is tapered, e.g., from mesial to distal or from distal to mesial.

Tube body 1218 or 1218' can be a single tube or a split tube body (as described above). The pad of base 1214 or 1214' can be manufactured to be a negative of the tooth surface. In some embodiments, an angled slot permits a custom base pad to be designed that better conforms to the tooth surface, and/or that permits the base to be placed more gingivally or more occlusally, as described above.

As described above, an orthodontist can debond a tube with standard utility pliers using an alternative design feature of the tube. As described herein, in some embodiments, an orthodontic tube may include a debonding structure comprising a ridge to facilitate debonding of a tube from a tooth. The ridge may be used to apply a force to the tube (e.g., with pliers) to remove the tube from a tooth. In some embodiments, a ridge may be located for easy access by a clinician. For example, the ridge may be located proximate an interface of a base of an orthodontic tube and a face of the orthodontic tube.

Figure 13A:
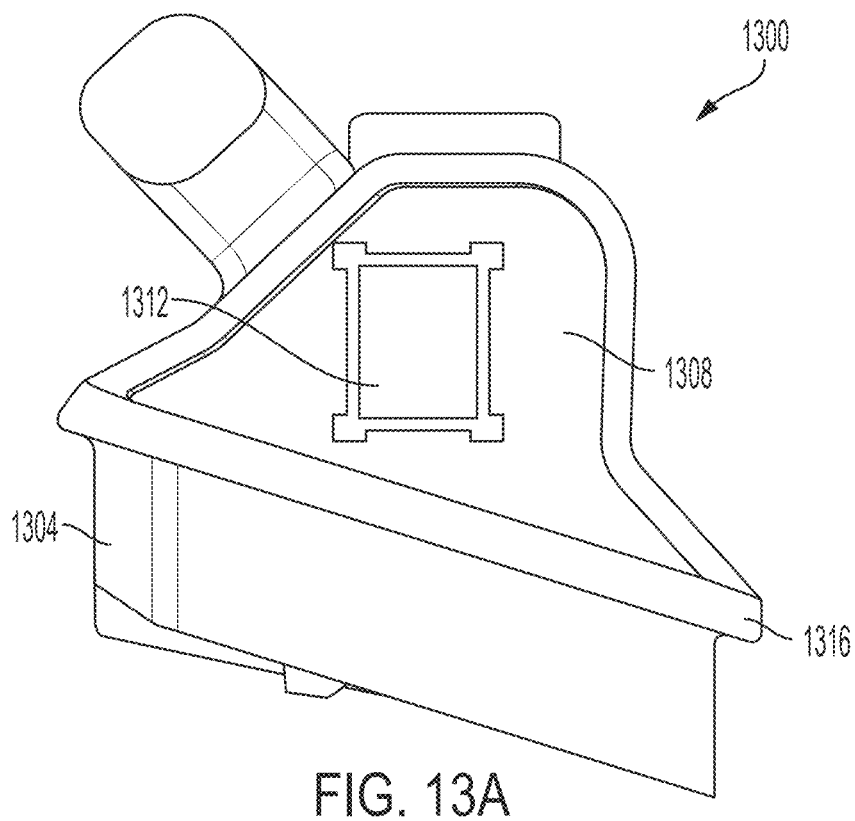
FIG. 13A shows an example orthodontic tube including a ridge defined around at least a portion of a circumferential surface of the tube base, according to some embodiments of the technology described herein.

FIG. 13A shows a tube 1300 including a base 1304 and a face 1308 including a slot body defining a slot 1312. A ridge 1316 is defined around at least a portion of a circumferential surface of the tube base 1304. The ridge 1316 can be positioned at an interface of the tube base 1304 and the tube face 1308.

Figure 13B:
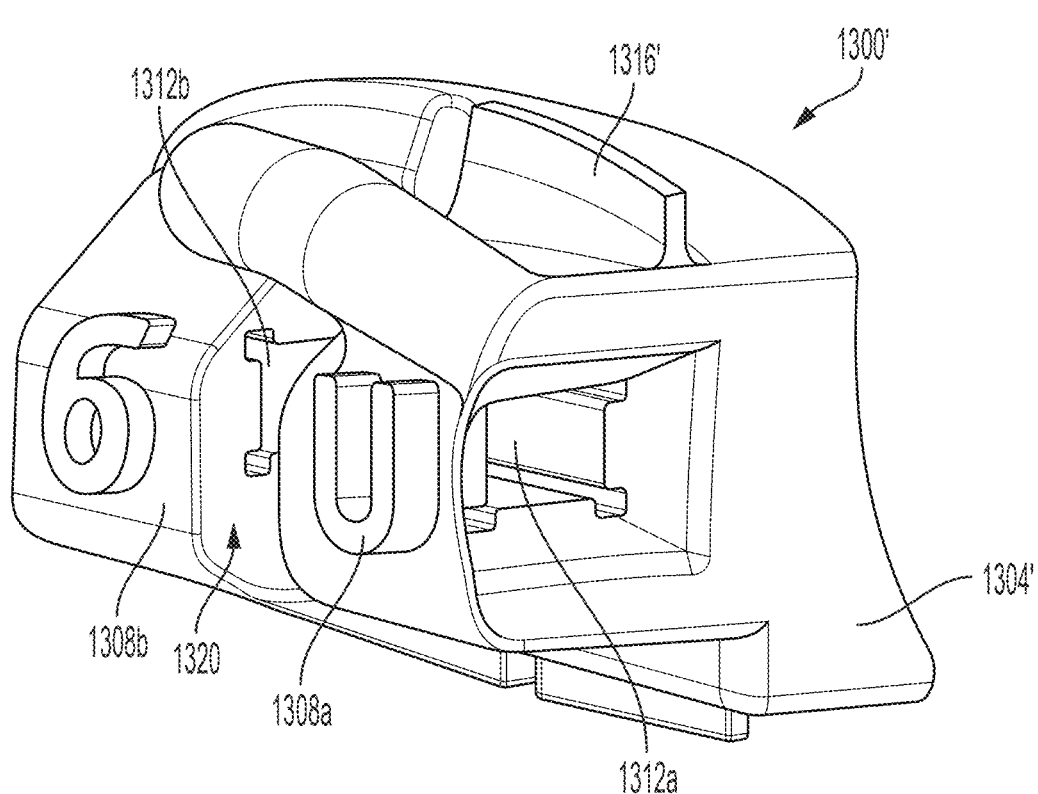
FIG. 13B shows an example orthodontic tube including a split slot body, according to some embodiments of the technology described herein.

FIG. 13B shows a tube 1300' including a base 1304' and a face including a split slot body 1308a, 1308b, each defining a slot 1312a, 1312b. A ridge 1316' is defined around at least a portion of a circumferential surface of the tube base 1304'. A gap 1320 is defined in the ridge corresponding to a position of the split in the slot body 1308a, 1308b. The gap can correspond to a stress concentrator. The ridge 1316' can be positioned at an interface of the tube base 1304' and the tube face defining slot body 1308a, 1308b.

In some embodiments, the ridge is positioned on a gingival edge surface of the tube, an occlusal edge surface of the tube, or both. The height of the ridge can vary along the mesial/distal axis of the tube structure. The height of the ridge can be from about 0.01 mm to about 1 mm. In some embodiments, the height of the ridge is about 0.04 mm. The height of the gingival ridge can be different from the height of the occlusal ridge.

Figure 20:
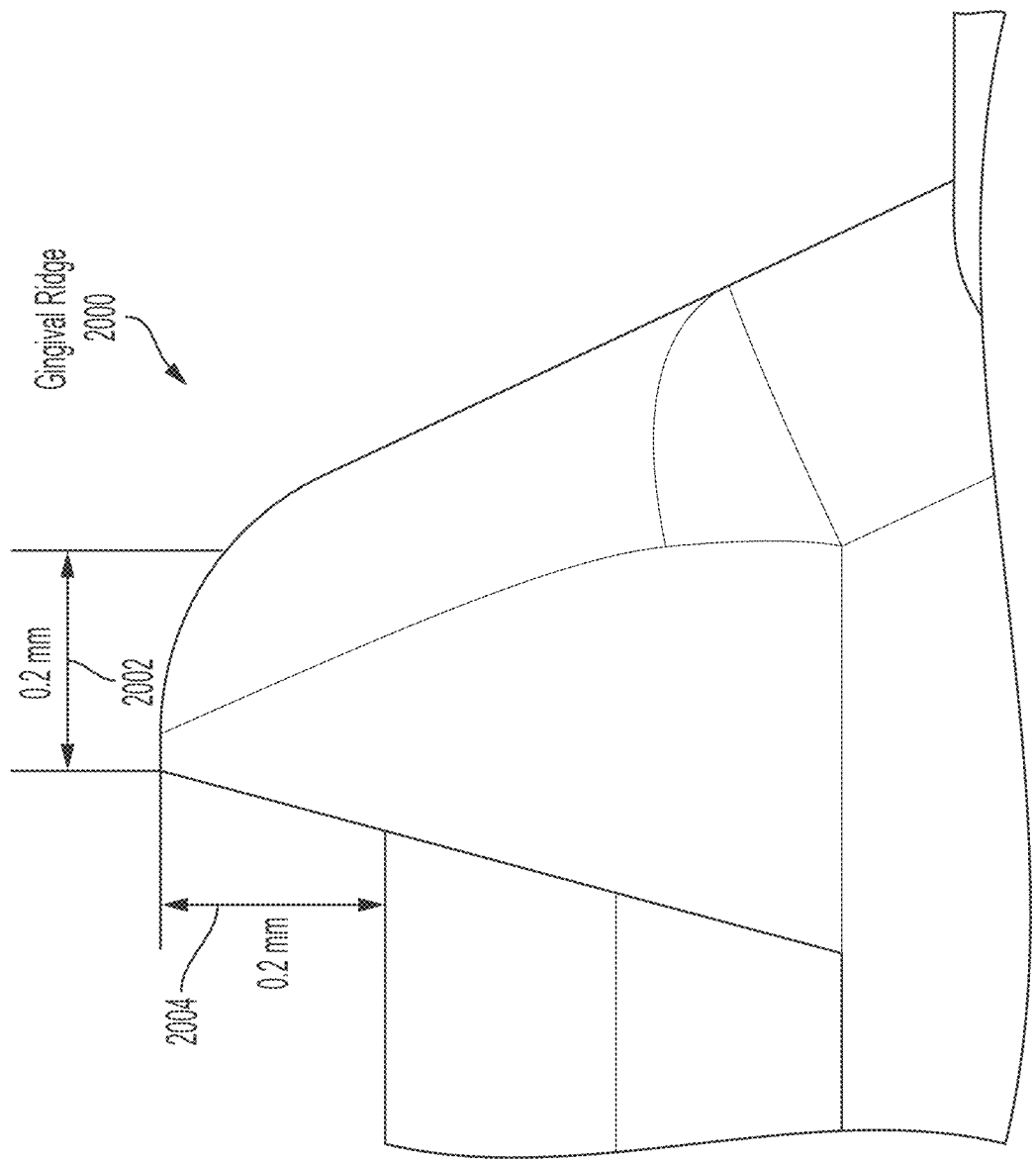
FIG. 20 shows a gingival ridge or portion thereof, according to some embodiments of the technology described herein.

FIG. 20 shows a gingival ridge 2000 or portion thereof, according to some embodiments of the technology described herein. As shown in FIG. 20, the gingival ridge 2000 is proximate an interface of a base of an orthodontic tube and a face of the orthodontic tube. In the example of FIG. 20, the height 2004 of the ridge gingivally/occlusally from the base is 0.2 mm. In the example of FIG. 20, the thickness 2002 of the ridge at an edge is 0.2 mm. As shown in the example of FIG. 20, the ridge widens closer to a base of the tube. In some embodiments, a height and/or thickness of the ridge may vary along a mesial-distal axis of an orthodontic tube.

Figure 14:
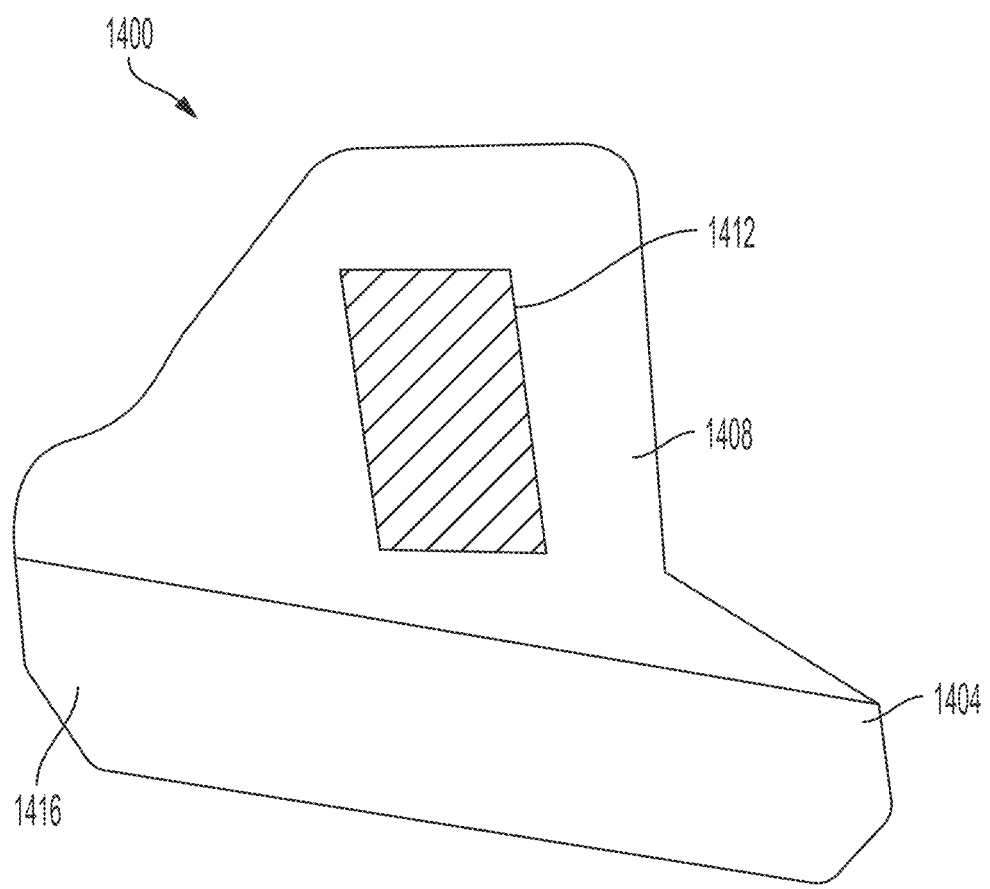
FIG. 14 shows an example orthodontic tube with a chamfer around a circumferential surface of the tube's base, according to some embodiments of the technology described herein.

FIG. 14 shows a tube 1400 including a base 1404 and a face 1408 including a slot body defining a slot 1412. A chamfer 1416 is defined around a circumferential surface of the base 1404. The chamfer can be positioned at an interface of the tube base 1404 and the tooth. The chamfer can be positioned on a gingival tube/tooth interface, an occlusal tube/tooth interface, or both. The chamfer can be configured to mate with an orthodontic tool for debonding the tube. For example, the tool can rest on the chamfer, or the tool can seat next to the chamfer. A height of the chamfer can be from about 0.01 mm to about 1 mm. In some embodiments, the height of the chamfer is about 0.04 mm. In some embodiments having a split tube body, a gap is formed in the chamfer.

Figure 15A:
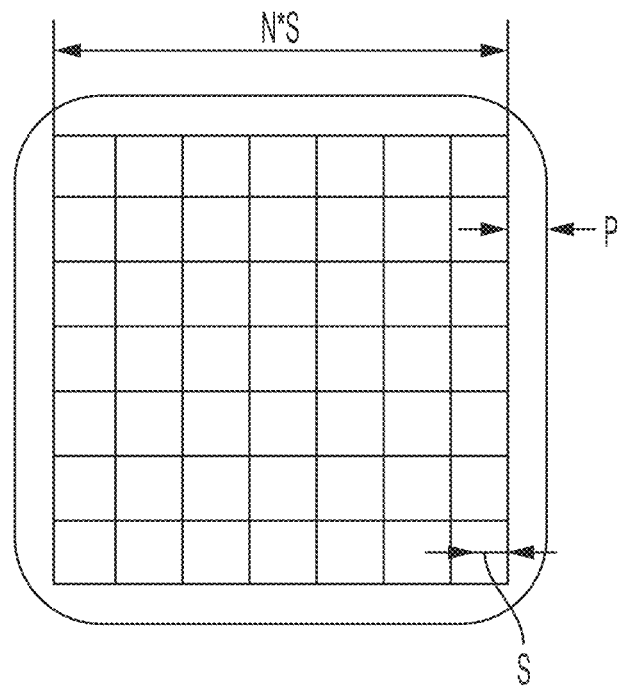
FIG. 15A shows a diagram of pixels to be polymerized, according to some embodiments of the technology described herein.

The dimensional accuracy of additively manufactured parts can be improved by adjusting which pixels are activated during polymerization. Typically, DLP printing accuracy is limited by pixel size and the amount of extra polymerization that occurs as a result of light scattering. Any straight line dimension within a layer can be described by the equation $N*S+2P$ where N is the number of pixels, S is the pixel size, and P is the excess polymerization. P is typically a factor of various aspects of the printer (e.g., light intensity and scattering, material composition etc.) and the part being printed, and cannot be controlled. S is a property of the printer being used and cannot be adjusted which leaves N as the only controllable parameter. As shown in FIG. 15A, the white squares represent pixels that are turned on by the design, and the blue shape P represents the resulting polymerized area.

For applications that require a high degree of dimensional accuracy, this can become a limiting factor as a designer can only adjust the part in increments of the pixel size. Grayscaling can be used to control the amount of over-polymerization (e.g., by adjusting the intensity of certain pixels) but this can be a cumbersome process that requires specialized software. A unique grayscale pattern would have to be developed for each part, and depending on the part's geometry, a different pattern may be needed for each layer of the print.

In some embodiments, by turning off certain pixels along the edge of the part, the amount of overpolymerization (P) can be controlled. In some embodiments, a system generating a 3D model of an orthodontic tube structure may be configured to determine a grayscale pattern for a portion of the orthodontic tube structure (e.g., a slot, slot edge, and/or other portion). The grayscale pattern may indicate a pattern of polymerization to be applied by an AM device at different locations in the portion of the orthodontic tube structure during manufacturing of an orthodontic tube. The system may be configured to apply the grayscale pattern to the portion of the orthodontic tube structure (e.g., slot or portion thereof). In some embodiments, the grayscale pattern may indicate varying levels of polymerization intensity. In one implementation, the grayscale pattern may indicate locations at which polymerization at which polymerization is to be turned off and locations at which polymerization is to be turned on. For example, the grayscale pattern may indicate that polymerization is to be turned on at one or more pixels and that polymerization is to be turned off at one or more other pixels of a portion of a 3D model of an orthodontic tube structure. In some embodiments, the grayscale pattern may be determined based on specifications of an AM device, dimensions of an orthodontic tube structure, and/or other factors.

Figure 15B:
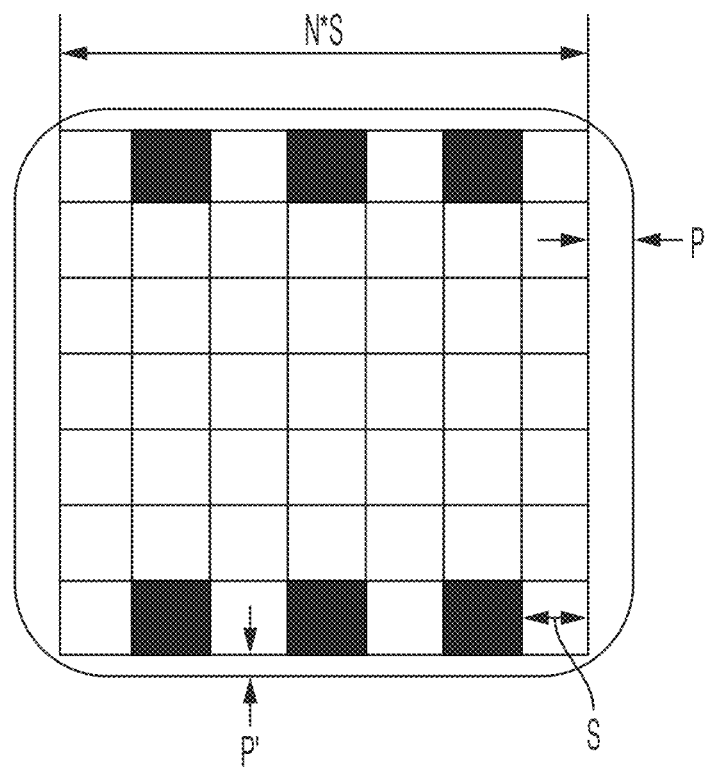
FIG. 15B shows a gray scale pattern for pixel polymerization, according to some embodiments of the technology described herein.

FIG. 15B shows an example grayscale pattern for a slot of an orthodontic tube structure, according to some embodiments of the technology described herein. In FIG. 15B, the white squares represent pixels that are turned on by the design, black squares represent pixels that are turned off, the blue shape P represents the resulting polymerized area adjacent the row of active pixels, and the blue shape P' represents the resulting polymerized area adjacent the row of pixels including deactivated pixels. By adjusting which pixels are turned on or off along the edge of a part, P' can be controlled to allow for dimensional accuracy smaller than the pixel size of the printer.

In some embodiments, two or more adjacent pixels can be deactivated. In some embodiments, the deactivated adjacent pixels may be along the edge or stacked. In some embodiments, two or more adjacent pixels can be activated, and a third pixel on either side of the activated adjacent pixels can be deactivated.

Figure 16A:
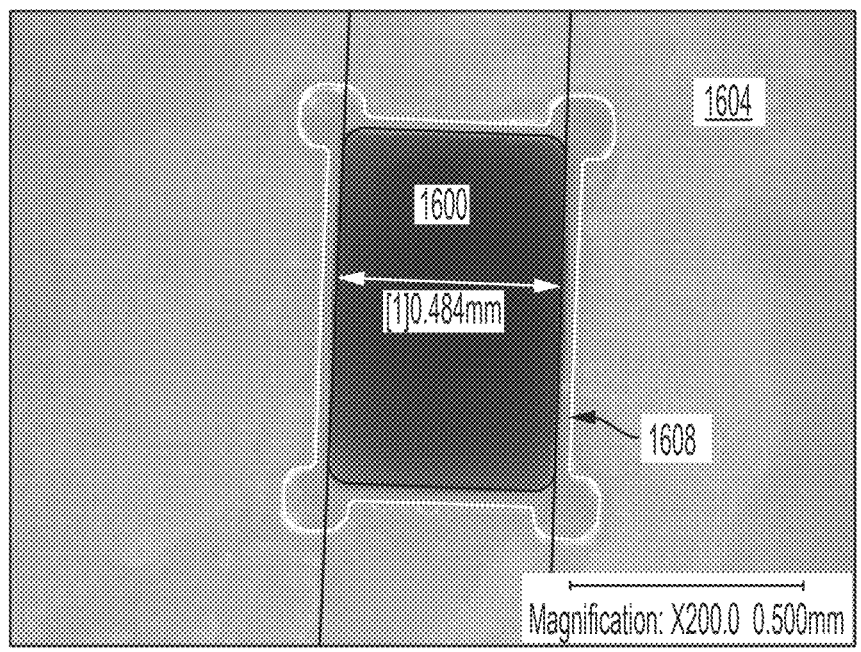
FIG. 16A shows a slot of an example orthodontic tube, according to some embodiments of the technology described herein.
Figure 16B:
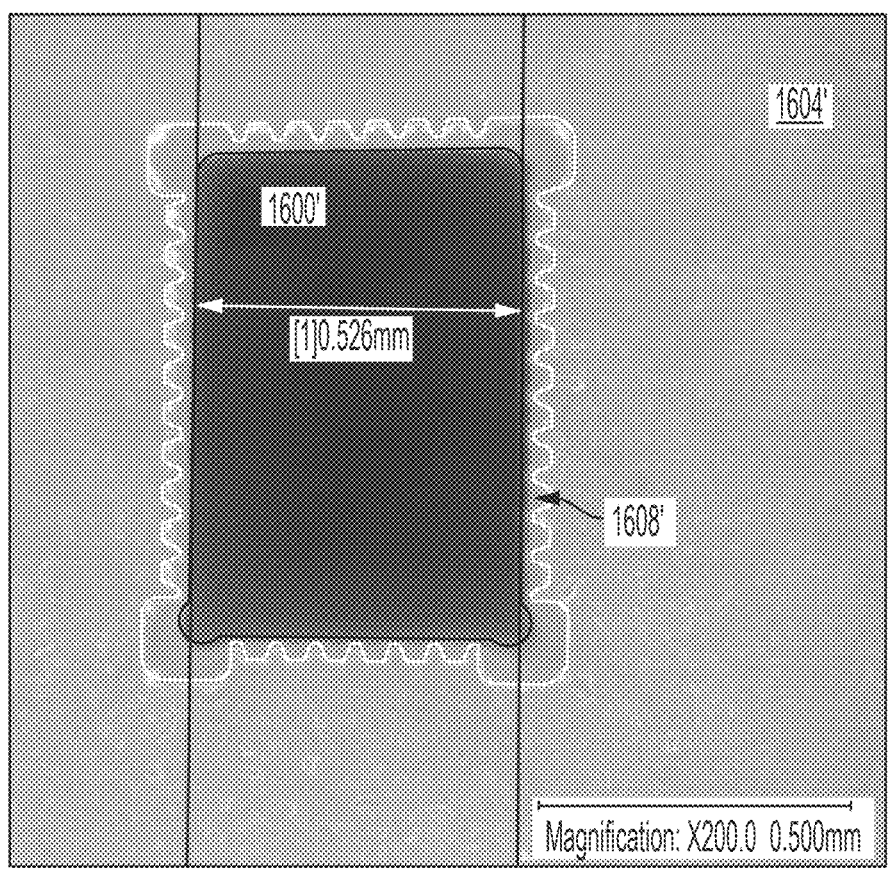
FIG. 16B shows a slot of an example orthodontic tube manufactured by alternating pixels along edges of the slot on and off, according to some embodiments of the technology described herein.

Pixel alternation can be built into the original part design and edited using modeling software, for example, during step 108 shown in FIG. 1. FIGS. 16A and 16B show an example of how this process can impact the dimensions of a printed slot. FIG. 16A shows a slot 1600 defined in a slot body 1604. FIG. 16B shows a slot 1600' defined in a slot body 1604'. Slot 1600 and slot 1600' have the same designed width, but having alternating pixels along the edge increases the actual printed width of slot 1066' by about 40 microns, which is equal to the pixel size of the printer on which these parts were printed. Slot wall 1608 has a flatter surface, while slot wall 1608' has a wavy surface, where each wave corresponds to a pixel that was deactivated.

Patients currently pay higher fees for ceramic tubes over metal due to their increased aesthetics. For example, many patients desire a tube that matches the color of the tooth to which the tube is attached. This may cause the tube to be less visible and provide improved appearance. As another example, embodiments of the present invention may provide the capability to produce clear tubes, which may provide still improved appearance. Additionally, embodiments of the present invention may provide the capability to produce tubes in almost any color desired or selected, for example, in bright colors for use in children and some adults. Likewise, embodiments of the present invention may provide the capability to produce tubes having visible shapes that are not dictated by function, such as in the shape of animals, vehicles, toys, etc., for example, for use in children and some adults.

Using the ceramic slurry-based AM technique can turn the designed model into a ceramic product rapidly. The tube manufacturing involves few steps and can be done on site, saving time and cost.

The described techniques may be made cost-effective to the point where an individual orthodontic practice could purchase the required equipment and software. This would provide the capability to simplify their tube inventory instead of stocking tubes of different prescriptions.

Digital light processing (lithography-based) of ceramics and laser lithography additive manufacturing have many advantages for orthodontic tube fabrication, in comparison to selective laser sintering/melting (SLM) which uses thermal energy, and 3-D printing (3DP) systems that use a binder and polymer-derived ceramics (PDCs). For example, DLP may provide higher surface quality, better object resolution, and improved mechanical properties. PDCs structured using light in a stereolithographic or mask exposure process may also be used as a ceramic AM method for tube fabrication.

The described techniques may be used to manufacture tubes from materials including high strength oxides, nitrides and carbides ceramics, and metals including but not limited to: Aluminum Oxide (Al2O3), Zirconium Oxide (ZrO2), Alumina-toughened Zirconia (ATZ), Zirconia-toughened alumina (ZTA), Lithium disilicate, Leucite silicate and Silicon Nitride as well as metals such as Stainless Steel 17-4PH or 316 L, Titanium (Ti/Ti-Al6-V4), Cobalt Chromium (CoCr), Tungsten and Tungsten Carbide/Cobalt (W or WC/Co), Silicon Carbide (SiC), Molybdenum (Mo) and precious metals (e.g. gold (Au)).

The described techniques may be used to attain a true straight wire appliance where tube placement accuracy is improved, thus reducing treatment time and error; or may also be used in conjunction with a custom-bent archwire to achieve ideal results.

Custom lingual tubes may be fabricated by this method, which may receive a pre-bent customized archwire as described by US Pat. App. Pub. No. 2007/0015104. Custom labial tubes may also receive pre-bent wires.

The procedure for the layering additive manufacturing (AM) methodology of the labial/lingual orthodontic tubes by lithography-based DLP (e.g. U.S. Pat. No. 8,623,264), which is incorporated herein by reference, but may be briefly summarized as follows: a light-polymerizable material, the material being located in at least one trough, having a particularly light-transmissive, horizontal bottom, is polymerized by illumination on at least one horizontal platform, the platform having a pre-specified geometry and projecting into a trough, in an illumination field, wherein the platform is displaced vertically to form a subsequent layer, light-polymerizable material is then added to the most recently formed layer, and repetition of the foregoing steps leads to the layered construction of the orthodontic tube in the desired prescription/mold, which arises from the succession of layer geometries determined from the CAD software. The trough can be shifted horizontally to a supply position, and the supply device brings light-polymerizable material at least to an illumination field of the trough bottom, before the at least one trough is shifted to an illumination position in which the illumination field is located below the platform and above the illumination unit, and illumination is carried out, creating a "green tube".

The light-polymerizable material or photo-reactive suspension (slurry) can be prepared based on commercially available di- and mono-functional methacrylates. An example material might be a slurry blend of about 0.01-0.025 wt % of a highly reactive photoinitiator, about 0.05-6 wt % a dispersant, an absorber, and about 2-20 wt % of a non-reactive diluent. A solid loading of a high strength oxide ceramic such as Aluminum Oxide (Al2O3) and Zirconium Oxide (ZrO2) powder can be used, but this process may extend to other ceramic materials and metals.

In some embodiments, the loading of alumina or zirconia in the slurry can be greater than or about 49 wt %, 50 wt %, 55 wt %, 60 wt %, 65 wt %, 70 wt %, 75 wt %, 80 wt %, 85 wt %, 90 wt %, 95 wt %, or 99 wt %. In some embodiments, the loading of alumina or zirconia in the slurry can be between 50-60 wt %, 60-70 wt %, 70-80 wt %, 80-90 wt %, 90-95 wt %, 95-100 wt %. The purity of the sintered alumina or zirconia can be greater than or about 95 wt %, 95.5 wt %. 96 wt %. 96.5 wt %, 97 wt %, 97.5 wt %, 98 wt %, 98.5 wt %, 99 wt %, 99.1 wt %, 99.2 wt %, 99.3 wt %, 99.4 wt %, 99.5 wt %, 99.6 wt %, 99.7 wt %, 99.8 wt % or 99.9 wt %. The reduction in part size from green body to sintered tube can be about 5%, 10%, 15%, 20%, 25%, 30%, 35%, 40%, 45% or 50%.

The acrylate moiety can be a monomer, oligomer or polymer. The acrylate moiety can include more than one methacrylate moiety. The weight content of the acrylate moiety can be between 5 wt % and 50 wt %. In some embodiments, the weight content is greater than or about 5, 10, 15, 20, 25, 30, 35, 40, or 45 wt %. The acrylate moiety can be a methacrylate moiety or an acrylate ester.

Figure 21:
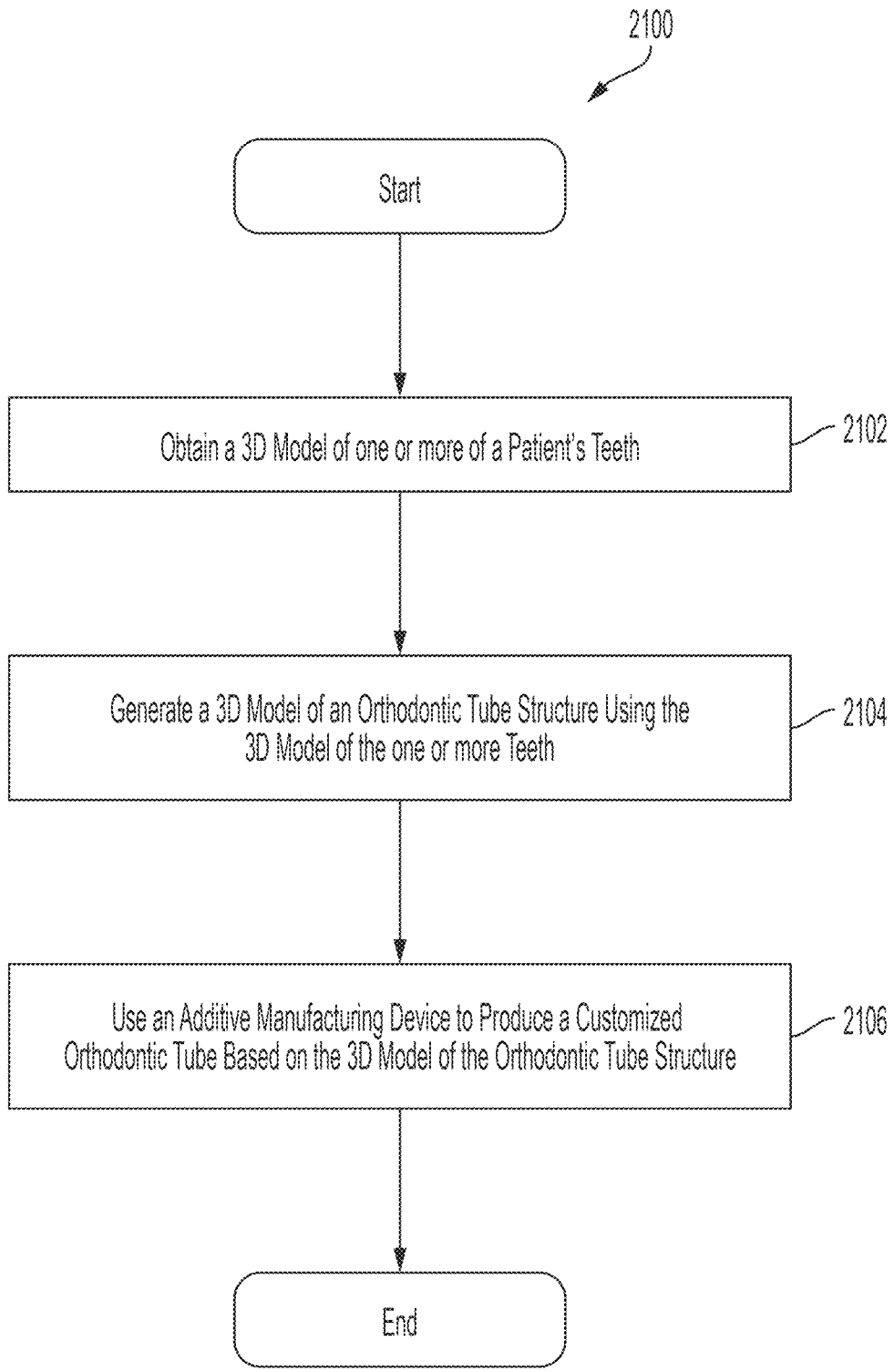
FIG. 21 shows a flowchart of an example process of manufacturing embodiments of orthodontic tubes described herein, according to some embodiments of the technology described herein.

FIG. 21 shows a flowchart of an example process 2100 of manufacturing embodiments of orthodontic tubes described herein, according to some embodiments of the technology described herein. Process 2100 may be performed by any suitable computer system. For example, process 2100 may be performed by computer system 700 described herein with reference to FIG. 17.

Process 2100 begins at block 2102, where the system obtains a 3D model of one or more of a patient's teeth. The 3D model of the patient's teeth may be obtained using a medical imaging device. For example, the 3D model of the patient's teeth maybe obtained using a CT scanner, intra-oral scanner, a coordinate measuring machine, a laser scanner, or a structured light digitizer.

Next, process 2100 proceeds to block 2104, where the system generates a 3D model of an orthodontic tube structure using the 3D model of the one or more teeth of the patient. In some embodiments, the system may be configured to generate the 3D model of the orthodontic tube structure based on an orthodontic prescription. Various embodiments of orthodontic tube structures are described herein with reference to FIGS. 2-16B. For example, the system may generate the 3D model of the orthodontic tube structure as a CAD model or other type of 3D model.

Next, process 2100 proceeds to block 2106, where the system uses an AM device to produce a customized orthodontic tube based on the 3D model of the orthodontic tube structure. In some embodiments, the system may be configured to transmit the 3D model of the orthodontic tube structure to an AM device for manufacturing. In some embodiments, the system may be configured to transmit the 3D model of the orthodontic tube structure to another party (e.g., a manufacturer) for production using an AM device. In some embodiments, the system may be a component of an AM device that may be used to produce the customized orthodontic tube. In some embodiments, the system may be configured to trigger production by an AM device (e.g., by transmitting a command to the AM device).

In some embodiments, the AM device may be any suitable AM device. For example, the AM device may be a photo-polymerization device, a material jetting device, a binder jetting device, a power bed fusion device (e.g., a selective later sintering device, a selective laser melting device, and electron beam melting device, or a direct metal laser sintering device), a sheet lamination device, or direct energy deposition device.

Figure 17:
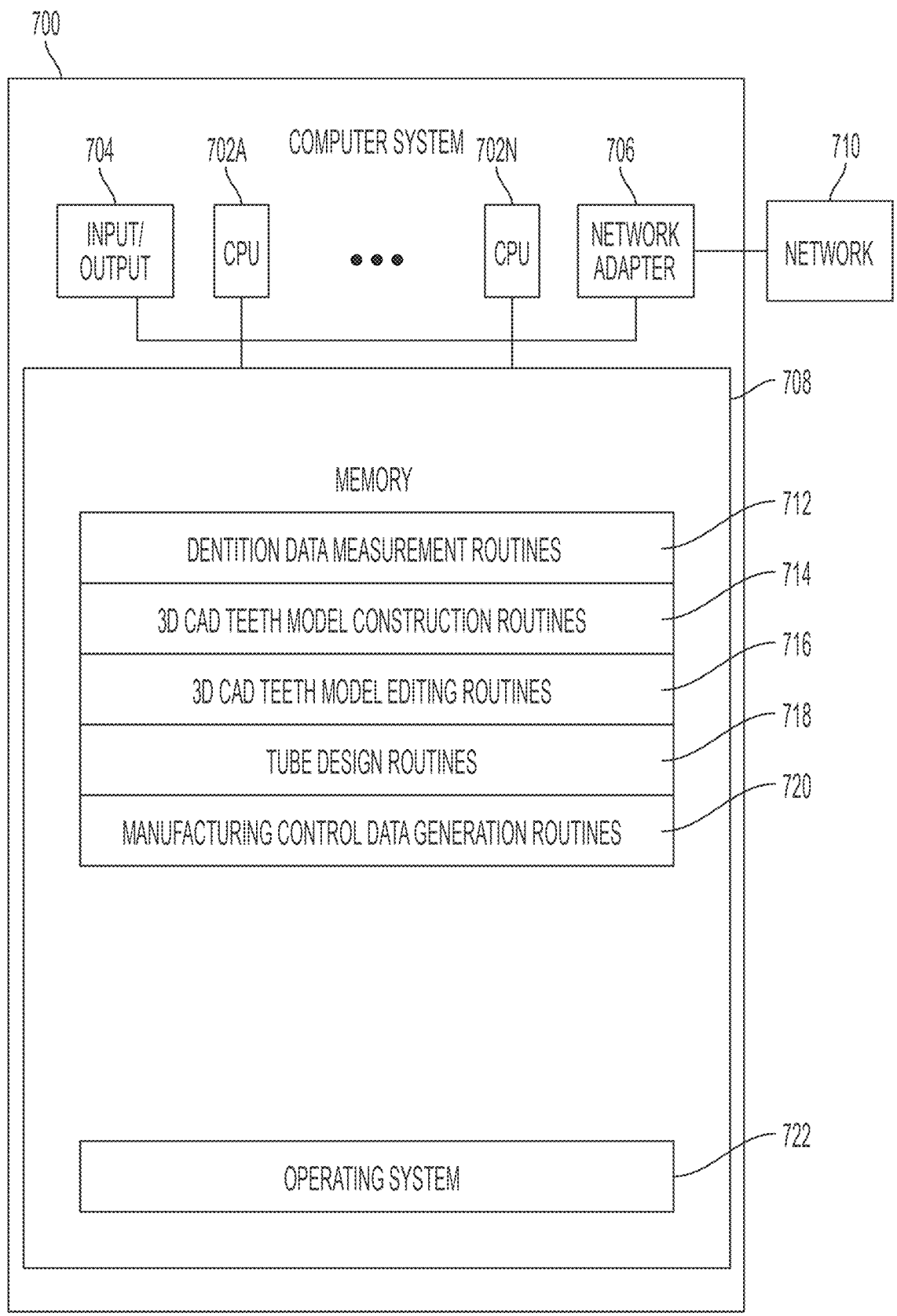
FIG. 17 shows an example computer system, according to some embodiments of the technology described herein.

An exemplary block diagram of a computer system 700, in which the processes shown above may be implemented, is shown in FIG. 17. Computer system 700 is typically a programmed general-purpose computer system, such as a personal computer, workstation, server system, and mini-computer or mainframe computer. Computer system 700 includes one or more processors (CPUs) 702A-702N, input/output circuitry 704, network adapter 706, and memory 708. CPUs 702A-702N execute program instructions in order to carry out the functions of embodiments of the present invention. Typically, CPUs 702A-702N are one or more microprocessors, such as an INTEL PENTIUM® processor. FIG. 17 illustrates an embodiment in which computer system 700 is implemented as a single multiprocessor computer system, in which multiple processors 702A-702N share system resources, such as memory 708, input/output circuitry 704, and network adapter 706. However, the present invention also contemplates embodiments in which computer system 700 is implemented as a plurality of networked computer systems, which may be single-processor computer systems, multi-processor computer systems, or a mix thereof.

Input/output circuitry 704 provides the capability to input data to, or output data from, computer system 700. For example, input/output circuitry may include input devices, such as keyboards, mice, touchpads, trackballs, scanners, etc., output devices, such as video adapters, monitors, printers, etc., and input/output devices, such as, modems, etc. Network adapter 706 interfaces device 700 with a network 710. Network 710 may be any public or proprietary LAN or WAN, including, but not limited to the Internet.

Memory 708 stores program instructions that are executed by, and data that are used and processed by CPU 702 to perform the functions of computer system 700. Memory 708 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 708 varies depending upon the function that computer system 700 is programmed to perform. In the example shown in FIG. 17, memory contents that may be included in a system in which a content analysis platform is implemented are shown. However, one-of-skill in the art would recognize that these functions, along with the memory contents related to those functions, may be included on one system, or may be distributed among a plurality of systems, based on well-known engineering considerations. Embodiments of the present invention contemplate any and all such arrangements.

In the example shown in FIG. 17, memory 708 may include dentition data measurement routines 712, 3D CAD teeth model construction routines 714, 3D CAD teeth model editing routines 716, tube design routines 718, manufacturing control data generation routines 720, and operating system 722. Dentition data measurement routines 712 may obtain and process dentition data, such as may be generated by CT layer scanning or a non-contact 3D scanner directly on the patient's teeth, or uses 3D readings on the teeth model previously cast. 3D CAD teeth model construction routines 714 may construct a 3D CAD model of the measured teeth based on the dentition data. 3D CAD teeth model editing routines 716 may be used to rearrange the teeth in the model to the desired treatment outcomes and may additionally be used to accept additional information, such as the desired torque, offset, angulation of select tubes and occlusal/incisal coverage for placement guide. tube design routines 718 may be used to design and generate a 3D CAD model based on the input 3D CAD model of the measured teeth, the model of the desired treatment outcomes, and the input additional information. Manufacturing control data generation routines 720 may be used to generate manufacturing control data for use by the production equipment. Operating system 722 provides overall system functionality.

It is to be noted that additional functionality may be implemented in end user devices, such as end user devices 104 shown in FIG. 1. End user systems may be computer systems having a structure similar to that shown in FIG. 17. Such end user systems may include geometric analysis routines to perform geometric analysis of a location of an advertisement or content. Likewise, such end user systems may include resource-based analysis routines to determine whether a computer is optimizing an advertisement or content for display on the screen.

As shown in FIG. 17, an embodiment of the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed, and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multitasking computing, as the terms task and process are often used interchangeably, although some operating systems make a distinction between the two.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of manufacturing customized orthodontic tubes for patients, the method comprising:
   obtaining a three-dimensional (3D) model of one or more teeth of a patient;
   generating a 3D model of an orthodontic tube structure using the 3D model of the one or more teeth of the patient, the orthodontic tube structure comprising:
      a base comprising a circumferential surface; and
      a debonding structure that facilitates debonding of an orthodontic tube from a tooth of the patient, the debonding structure separated from the surface of the base by material of the orthodontic tube structure, wherein the debonding structure comprises a ridge for application of force to the orthodontic tube for removal from the tooth, the ridge located on at least a portion of the circumferential surface of the base; and
   using an additive manufacturing device to produce a customized orthodontic tube based on the 3D model of the orthodontic tube structure.

2. The method of claim 1, wherein at least a portion of the debonding structure has a customized shape based on a 3D model of at least one of the one or more teeth.

3. The method of claim 1, wherein the debonding structure comprises a stress concentrator in a portion of the orthodontic tube structure.

4. The method of claim 3, wherein the stress concentrator is shaped such that the customized orthodontic tube fractures when a normal force applied to the stress concentrator.

5. The method of claim 3, wherein the stress concentrator runs along an occlusal-gingival direction of the orthodontic tube structure.

6. The method of claim 3, wherein the stress concentrator includes a portion with a profile that is substantially triangular cross-section.

7. The method of claim 1, wherein the ridge is proximate an interface of the base of the orthodontic tube structure and a face of the orthodontic tube structure.

8. The method of claim 1, wherein a height of the ridge varies along a mesial-distal axis of the orthodontic tube structure.

9. An additively manufactured customized orthodontic tube produced by an additive manufacturing device using a 3D model of an orthodontic tube structure generated using a 3D model of one or more teeth of a patient, the additively manufactured customized orthodontic tube comprising:
  a base comprising a circumferential surface; and
  a debonding structure that facilitates debonding of the customized orthodontic tube from a tooth of the patient, the debonding structure separated from the surface of the base by material of the customized orthodontic tube, wherein the debonding structure comprises a ridge for application of force to the orthodontic tube for removal from the tooth, the ridge located on at least a portion of the circumferential surface of the base.

10. The additively manufactured customized orthodontic tube of claim 9, wherein at least a portion of the debonding structure has a customized shape based on a 3D model of at least one of the one or more teeth.

11. The additively manufactured customized orthodontic tube of claim 9, wherein the debonding structure comprises a stress concentrator in a portion of the customized orthodontic tube.

12. The additively manufactured customized orthodontic tube of claim 11, wherein the customized orthodontic tube fractures in response to application of a normal force to the stress concentrator.

13. The additively manufactured customized orthodontic tube of claim 11, wherein:
  the stress concentrator comprises an approximately V-shaped space between two portions of the customized orthodontic tube; and
  a vertex of the approximately V-shaped space is proximate the base.

14. The additively manufactured customized orthodontic tube of claim 13, wherein:
  each of the two portions comprises a substantially flat wall on a respective side of the approximately V-shaped space.

15. The additively manufactured customized orthodontic tube of claim 9, further comprising:
  a face perpendicular to the base;
  wherein the ridge is located, at least in part, proximate an intersection of the base and the face.

16. The additively manufactured customized orthodontic tube of claim 15, wherein the face comprises a slot opening sized for an arch wire to be inserted through the slot.

17. The additively manufactured customized orthodontic tube of claim 9, wherein the customized orthodontic tube comprises two portions separated, at least in part, by a space, and the ridge comprises a first ridge and a second ridge, wherein:
  a first ridge is located on a first one of the two portions; and
  a second ridge is located on a second one of the two portions.

18. The additively manufactured customized orthodontic tube of claim 17, wherein the space separating the two portions is a stress concentrator.

19. The additively manufactured customized orthodontic tube of claim 9, further comprising:
  multiple portions each comprising a respective slot extending through the portion.

20. The additively manufactured customized orthodontic tube of claim 19, wherein slots of the multiple portions are aligned such that arch wire passes through the slots of the multiple portions.

* * * * *